United States Patent
Spinelli et al.

(10) Patent No.: US 11,470,424 B2
(45) Date of Patent: Oct. 11, 2022

(54) MXENE-BASED VOICE COILS AND ACTIVE ACOUSTIC DEVICES

(71) Applicant: Drexel University, Philadelphia, PA (US)

(72) Inventors: Devon J. Spinelli, Smithtown, NY (US); Thomas Heng, Philadelphia, PA (US); Asia Sarycheva, Philadelphia, PA (US); Pavel S. Lelyukh, Bristol, PA (US); Yury Gogotsi, Warminster, PA (US)

(73) Assignee: Drexel University, Philadelphia, PA (US)

( * ) Notice: Subject to any disclaimer, the term of this patent is extended or adjusted under 35 U.S.C. 154(b) by 0 days.

(21) Appl. No.: 17/054,291

(22) PCT Filed: Jun. 4, 2019

(86) PCT No.: PCT/US2019/035328
§ 371 (c)(1),
(2) Date: Nov. 10, 2020

(87) PCT Pub. No.: WO2019/236539
PCT Pub. Date: Dec. 12, 2019

(65) Prior Publication Data
US 2021/0250693 A1 Aug. 12, 2021

Related U.S. Application Data

(60) Provisional application No. 62/681,130, filed on Jun. 6, 2018.

(51) Int. Cl.
*H04R 9/04* (2006.01)
*H04R 7/04* (2006.01)
(Continued)

(52) U.S. Cl.
CPC ............... *H04R 9/046* (2013.01); *H04R 7/04* (2013.01); *H04R 9/025* (2013.01); *H04R 9/06* (2013.01);
(Continued)

(58) Field of Classification Search
CPC . H04R 9/046; H04R 9/06; H04R 9/08; H04R 7/04; H04R 2307/025
See application file for complete search history.

(56) References Cited

U.S. PATENT DOCUMENTS 4,801,368 A 1/1989 Yamashita et al.
6,180,049 B1 1/2001 Jang et al.
(Continued)

FOREIGN PATENT DOCUMENTS

EP 0948067 A1 10/1999
EP 1381099 A1 1/2004
(Continued)

OTHER PUBLICATIONS

Barsoum et al., "Room-Temperature Deintercalation and Self-Extrusion of Ga from Cr2GaN", Science, May 7, 1999, 284(5416), 937-939.
(Continued)

*Primary Examiner* — Sunita Joshi
(74) *Attorney, Agent, or Firm* — BakerHostetler

(57) ABSTRACT

The present disclosure is directed to electroacoustical devices comprising patterned MXene compositions on biaxially oriented polymer substrates and methods of making and using the same.

19 Claims, 11 Drawing Sheets

(51) Int. Cl.
    *H04R 9/02*     (2006.01)
    *H04R 9/06*     (2006.01)
    *H04R 9/08*     (2006.01)
    *H04R 31/00*    (2006.01)

(52) U.S. Cl.
    CPC .............. *H04R 9/08* (2013.01); *H04R 31/003* (2013.01); *H04R 2307/025* (2013.01); *H04R 2400/11* (2013.01)

(56) References Cited

U.S. PATENT DOCUMENTS

| | | |
|---|---|---|
| 6,555,268 B1 | 4/2003 | Inoue et al. |
| 7,446,190 B2 | 11/2008 | Sadelain et al. |
| 8,305,714 B2 | 11/2012 | Suzuki et al. |
| 9,147,933 B2 | 9/2015 | Alexopoulos et al. |
| 9,432,788 B2 | 8/2016 | Colich et al. |
| 2002/0068488 A1 | 6/2002 | Tuller et al. |
| 2003/0148184 A1 | 8/2003 | Omaru et al. |
| 2003/0224168 A1 | 12/2003 | Mack et al. |
| 2004/0048157 A1 | 3/2004 | Neudecker et al. |
| 2007/0065725 A1 | 3/2007 | Inoue et al. |
| 2007/0066503 A1 | 3/2007 | Basaly |
| 2009/0017332 A1 | 1/2009 | Kisi et al. |
| 2010/0236937 A1 | 9/2010 | Rosvall et al. |
| 2010/0322909 A1 | 12/2010 | Okada et al. |
| 2011/0017585 A1 | 1/2011 | Zhamu et al. |
| 2011/0104464 A1 | 5/2011 | Pyzik et al. |
| 2013/0194159 A1* | 8/2013 | Alexopoulos ............ H01Q 1/38 343/895 |
| 2016/0033592 A1* | 2/2016 | Demir ................. G01R 33/3628 324/322 |
| 2017/0251318 A1* | 8/2017 | Gaskell ................. H04R 31/003 |
| 2019/0181543 A1* | 6/2019 | Gogotsi .................... C09D 1/00 |

FOREIGN PATENT DOCUMENTS

| | | |
|---|---|---|
| JP | 08-078018 A | 3/1996 |
| JP | 10-112316 A | 4/1998 |
| JP | 2005-158725 A | 6/2005 |
| JP | 2007-214137 A | 8/2007 |
| JP | 2008-219739 A | 9/2008 |
| JP | 2008219739 A * | 9/2008 |
| WO | 02/81372 A2 | 10/2002 |
| WO | 02/96799 A2 | 12/2002 |
| WO | 2005/007566 A2 | 1/2005 |
| WO | 2006/112869 A2 | 10/2006 |
| WO | 2007/093011 A1 | 8/2007 |
| WO | 2007/121931 A2 | 11/2007 |
| WO | 2009/063031 A2 | 5/2009 |
| WO | 2009/091826 A2 | 7/2009 |
| WO | 2010/128492 A1 | 11/2010 |
| WO | 2011/086391 A1 | 7/2011 |
| WO | 2012/120264 A1 | 9/2012 |
| WO | 2018/039298 A1 | 3/2018 |

OTHER PUBLICATIONS

Barsoum et al., "The Topotactic Transformation of Ti3SiC2 into a Partially Ordered Cubic Ti(C0.67Si0.06) Phase by the Diffusion of Si into Molten Cryolite", Journal of the Electrochemical Society, 1999, 146(10), 3919-3923.
Barsoum, "Physical Properties of the MAX phases", Encyclopedia of Materials: Science and Technology, 2006, 11 pgs.
Barsoum, et al., "Synthesis and Characterization of a Remarkable Ceramic: Ti3SiC2," J Amer. Chem. Soc., 1996 79(7), 1953-1956.
Barsoum, M. and El-Raghy, T., "The MAX Phases: Unique New Carbide and Nitride Materials", American Scientist, Jul.-Aug. 2001, 89:334-343.
Barsoum, M., "The MN+1AXN phases: New Class of Solids", Progress In Solid State Chemistry, Jan. 1, 2000, 28(1-4), 201-281.
Chang, et al., "Synthesis of a new graphene-like transition metal carbide by de-intercalating Ti.sub.3AlC.sub.2", Mater. Lett. 109 (2013) 295-298.
Chen et al., "Microstructure and Phase Transformation of Ti 3 AC 2 (A= Al, Si) In Hydrofluoric Acid Solution", Crystal Research and Technology, Oct. 27, 2014, 49(10), 813-819.
Chen, et. al., "In-situ Synthesis of Ti.sub.3AlC.sub.2/TiC-A1.sub.2O.sub.3 Composite from TiO.sub.2-A1-C System", J. Mater. Sci. Technol., 22(4), Nov. 2006, 455-458.
Coleman et al., "Two-Dimensional Nanosheets Produced by Liquid Exfoliation of Layered Materials", Science, Feb. 4, 2011, 331, 568-571.
Eis, PS et al., Accumulation of miR-155 and BIC RNA in Human B Cell Lymphomas. Proceedings of the National Academy of Sciences of the United States of America, Mar. 8, 2005, 102(10), 3627-3632, Abstract.
Eklund et al., "The Mn+1AXn Phases: Materials Science and Thin-Film Processing", Thin Solid Films, 2010, 518, 1851-1878.
Ghidiu, et al., "Conductive Two Dimensional Titanium Carbide 'Clay' with High Volumetric Capacitance", Nature, 516 (2014) 78-81.
Hendaoui, et al., Ti—Al—C MAX Phases by Aluminothermic Reduction Process, International Journal of Self-Propagating High-Temperature Synthesis, 17 (2008) 125-128.
Hu, C., "Low Temperature Thermal Expansion, High Temperature Electrical Conductivity, and Mechanical Properties of Nb4AlC3 Ceramic Synthesized by Spark Plasma Sintering", Journal of Alloys and Compounds, Nov. 13, 2009, 487(1-2), 675-681.
Hu, et al., "A New Family of Promising Hydrogen Storage Medium", J. Phys. Chem., A 117 (2013 14253-14260.
Hu, et. al., "Two-Dimensional Sc2C: A Reversible and High-Capacity Hydrogen Storage Material Predicted by First-Principles Calculations", Int J. Hydrogen Energy, Jul. 2014, vol. 39(20), 10606-10612.
J et al: "A Non-Aqueous Asymmetric Cell with a Ti 2 C-Based Two-Dimensional Negative Electrode", A1368 Journal of The Electrochemical Society, Jan. 1, 2012, pp. 1368-1373.
Korzhavyi et al., "Ab Initio Study of Phase Equilibria in TiC.sub.x", Physical Review Letters, Dec. 18, 2001, 88(1), 1-4.
Kulkarni et al., Thermal Expansion and Stability of Ti2SC in Air and Inert Atmospheres, Journal of Alloys and Compounds, 2009, 469, 395-400.
Mogilevsky et al., "The Structure of Multilayered Titania Nanotubes Based on Delaminated Anatase", Chemical Physics Letters, Jul. 30, 2008, 460(4-6), 517-520.
Myhra, et al., "Crystal-Chemistry of the Ti.sub.3AlC.sub.2 and Ti.sub.4AlN Layered Carbide/Nitride Phases—Characterization by XPS", Journal of Physics and Chemistry of Solids, Apr. 2001, vol. 62(4), 811-817.
Nadeau, "Clay Particle Engineering: a Potential New Technology with Diverse Applications", Applied Clay Science, Mar. 1987, 2, 83-93.
Naguib et al., "Mxene: A Promising Transition Metal Carbide Anode for Lithium-ion Batteries", Electrochemistry Communications, Mar. 2012, 16, 61-64.
Naguib et al., "New Two-dimensional Niobium and Vanadium Carbides as Promising Materials for Li-Ion Batteries", American Chemical Society, Oct. 2013, 135(43), 15966-15969.
Naguib et al., Synthesis of a New Nanocrystalline Titanium Aluminum Fluoride Phase By Reaction Of Ti2aic With Hydrofluoric Acid, RSC Adv.1:1493-1499, 2011. [retrieved on Mar. 7, 2014], Retrieved from the internet: <URL:http://pubs.rsc.org .ezproxy.neu.ed u/en/Content/Articlelanding/2011/RA/c1ra00390a#/div, Abstract.
Naguib et al., "Two-Dimensional Nanocrystals Produced by Exfoliation of Ti.sub.3AlC.sub.2", Advanced Materials, 2011, 23, 4248-4253.
Naguib et al., "Two-Dimensional Transition Metal Carbides", American Chemical Society, Feb. 2012, 6(2), 1322-1331.
Naguib, et al., "Mxenes: A New Family of Two-Dimensional Materials", Adv. Mater., Feb. 2014, vol. 26(7), 992-1005.
Peng, et al., "Unique Lead Adsorption Behavior of Activated Hydroxyl Group in Two-Dimensional Titanium Carbide", J Am. Chem. Soc., Mar. 2014, 136(11), 4113-4116.

(56) References Cited

OTHER PUBLICATIONS

Rao et al., "A Study of the Synthetic Methods and Properties of Graphenes", Science and Technology of Advanced Materials, Oct. 27, 2010, 11, 1-15.
Savoskin et al., "Carbon Nanoscrolls Produced From Acceptor-Type Graphite Intercalation Compounds", 2007, Carbon, 45, 2797-2800.
Schmidt, et al., "XPS Studies of Amino Acids Absorbed on Titanium Dioxide Surfaces", Fresenius Journal of Analytical Chemistry, May 1991, 341, 412-415.
Spanier et al., "Vibrational Behavior of the Mn+1AXn phases from First-Order Raman Scattering „M=Ti ,V,Cr, A=Si, X=C,N)", Physical Review B, Jan. 2005, 71, 1-4.
Stankovich et al., "Graphene-based Composite Materials", Nature, Jul. 2006, 442, 282-286.
Su et al., "High-Cuality Thin Graphene Films from Fast Electrochemical Exfoliation", ACS Nano, 2011,5(3), 2332-2339.
Tang, et al., "Are MXenes Promising Anode Materials for Li Ion Batteries? Computational Studies on Electronic Properties and Li Storage Capability of ThC2 and ThC2X2 (X=F, Oh) Monolayer", J. Am. Chem. Soc., Sep. 2012, 134(40), 16909-16916.
Tran et al., "Lithium Intercalation in Porous Carbon Electrodes", Material Research Society 1995 Spring Meeting, San Francisco, CA, Apr. 17-21, 1995, 12 Pages.
Travaglini et al., "The Corrosion Behavior of Ti3SiC2 In Common Acids and Dilute NaOH", Corrosion Science, Jun. 1, 2003, 45(6), 1313-1327.
Tzenov et al., "Synthesis and Characterization of TI3ALC2", Journal of the American Ceramic Society, Jan. 1, 2000, 83(4), 825-832.
Viculis et al., "A Chemical Route to Carbon Nanoscrolls", Science, Feb. 28, 2003, 299, p. 1361.
Viculis, et al., "Intercalation and Exfoliation Routes to Graphite Nanoplatelets", Journal of Materials Chemistry, 2005, vol. 15, 974-978.
"Grafix Plastics; Maple Heights," General DuraLar Spec Sheet, OH ; https://www.grafixplastics.com/materials-plastic-film-plastic-sheets/commodity-plastic-film/polyester-mylar-duralar-film/duralar-polyester-film-sheet-products/archival-film-duralar/, Accessed on Mar. 10, 2018, pp. 9.
Alhabeb, M., et al., "Guidelines for Synthesis and Processing of 2D Titanium Carbide (Ti3C2Tx MXene)" Chemistry of Materials, vol. 29, Issue 18, Aug. 25, 2017, pp. 1-13.
Aluminum 6061-T6, Aerospace Specification Metals Inc. http://asm.matweb.com/search/SpecificMaterial.asp?bassnum=ma6061t6, Accessed Mar. 10, 2018, pp. 2.
Anasori et al., "2D Metal Carbides and Nitrides (MXenes) for Energy Storage," Nature Reviews Materials, vol. 2, No. 2, Feb. 2017, 16098.
Asgarisabet, M., et al., "COMSOL Multiphysics® Simulation of Electro Dynamic Planar Loudspeaker (EDPL)" Harman International,2016, pp. 1.
Davis, G.,et al.,"The sound reinforcement handbook," Hal Leonard Corporation, Jun. 1989, pp. 1-431.
Dillon, A. D., et al., "Highly Conductive Optical Quality Solution-Processed Films of 2D Titanium Carbide," Advanced Function Materials, vol. 26, Issue 23, Apr. 9, 2016, pp. 4162-4168.
Doctorproaudio.com "Speaker power handling < Pro-Audio References," Available at: http://www.doctorproaudio.com/doctor/temas/powerhandling.htm, Accessed on Mar. 12, 2018, pp. 6.
H. S. S. Ramakrishna Matte et al: "MoS2 and WS2 Analogues of Graphene", Angewandte Chemie International Edition, vol. 49, No. 24, Apr. 28, 2010 pp. 4059-4062.
Hantanasirisakul, k., et al., "Fabrication of Ti3C2Tx MXene Transparent Thin Films with Tunable Optoelectronic Properties" Advanced Electronin Materials, vol. 2, Issue 6, Apr. 21, 2016, pp. 8.
Haymel, S., "Alternating Current (AC) vs. Direct Current (DC)," Learn.sparkfun.com, Available: https://learn.sparkfun.com/tutorials/alternating-current-ac-vs-direct-current-dc, Accessed on Mar. 19, 2018, pp. 10.
Jiwu Shang et al: "Fabrication and dielectric properties of oriented polyvinylidene fluoride nanosheets", Materials Chemistry and Physics, Elsevier SA, Switerland, Taiwan, Republic of China, vol. 134, No. 2, Mar. 23, 2012 pp. 867-874.
Klasco, M., et al., "The Voice Coil: Parts and Production," AudioXpress, Mar. 2012, pp. 8-12.
Landgraf, R., et al., "Functionalization of Polymer Sensor Surfaces by Oxygen Plasma Treatment," Procedia Chemistry, Sep. 2009, vol. 1, No. 1, pp. 1015-1018.
Maleski, K., et al., "Dispersions of Two-Dimensional Titanium Carbide MXene in Organic Solvents," Chem. Mater. vol. 29, No. 4, Feb. 17, 2017, pp. 1632-1640.
Nave, R., "Features of Equal Loudness Curves", Hyperphysics.phy-astr.gsu.edu, http://hyperphysics.phy-astr.gsu.edu/hbase/Sound/earcrv.html, Accessed on Mar. 19, 2018, pp. 2.
Nave, R., "Hyperphysics.phy-astr.gsu.edu," Available http://hyperphysics.phy-astr.gsu.edu/hbase/electric/farlaw.html, Accessed on Mar. 19, 2018, pp. 4.
Oster, A. J.,"Copper alloy data," http://www.ajoster.com/sites/default/files/downloads/C-11000_B152_copper_aj-oster.pdf. Accessed on Mar. 10, 2018.
Sala, V., "Diagnosis method for suspension-errors detection in electro-dynamic loud-speakers," IEEE International Instrumentation and Measurement Technology Conference, Jul. 7, 2011, pp. 1-4.
Tian, He., et al., "Single-layer graphene sound-emitting devices: experiments and modeling," Nanoscale, vol. 4, No. 7, Apr. 7, 2012, pp. 2272-2277.
Vesel, A.,et al., "XPS study of oxygen plasma activated PET," Vacuum, vol. 82, No. 2, Oct. 29, 2007, pp. 248-251.
Wong, J., "Advantages and Disadvantages of Ultrasonic Sensor," Ultrasonic Transducers and Ultrasonic Sensors—Beijing Ultrasonic, Available: https://www.bjultrasonic.com/ultrasonic-technical-info/ultrasonic-transducers-and-ultrasonic-sensors/, Apr. 9, 2013, Accessed on Mar. 19, 2018, pp. 5.
Zhou, Q., et al., "Electrostatic Graphene Loudspeaker," Applied Physics letter, vol. 102, Issue 22, Jun. 5, 2013, pp. 1-16.

* cited by examiner

Figure 22: Effect of trace (a) width and (b) length on sound pressure level

Figure 23: ΔdBA SPL output of serpentine coil compared to spiral coils

US 11,470,424 B2

MXENE-BASED VOICE COILS AND ACTIVE ACOUSTIC DEVICES

CROSS-REFERENCE TO RELATED APPLICATIONS

This application is the National Stage Application of International Patent Application No. PCT/US2019/035328, filed Jun. 4, 2019, which claims priority to U.S. Patent Application Ser. No. 62/681,130, filed Jun. 6, 2018, the contents of which are incorporated by reference in their entirety.

TECHNICAL FIELD

The present disclosure is the use of patterned MXene compositions in voice coils used in speakers.

BACKGROUND

There are various types of speakers, such as electrostatic, planar magnetic, and conventional cone speakers that all operate by receiving an input electrical signal that excites the diaphragm to produce sound. In case of the planar magnetic speaker, the input electrical signal comes in the form of an AC current. It is important to use AC due to the ability to flip polarity and also have various phases and frequencies as well as coupling with magnets attached to the voice coil. Without the use of AC current, planar magnetic loudspeakers would not be able to create different sounds, as DC current is only able to produce a constant voltage. Alternating positive and negative signals are what ultimately allow loudspeakers to produce diaphragm oscillations.

For oscillations to occur, the AC current must pass through a voice coil. When designing a voice coil, inductance and impedance must be considered. Variables that affect inductance include number of coil turns, magnetic flux passing through the coils, and the current flowing through the coil. The role of the voice coil is to act as an electromagnet, that creates a magnetic field when subjected to an electrical current. This follows Faraday's law of induction, which states that an electric circuit produces a magnetic field when current is passed through it. The voice coil creates an alternating magnetic field, generated by a variable input current, interacting with the permanent magnet to vibrate the attached diaphragm in a piston-like motion, displacing the air around to produce sounds based on the input signal.

Most voice coils are made from copper or aluminum, owing to the excellent electrical conductivity and light weight of these materials. However, these conductive traces are typically prepared either by adhering these metals to the diaphragm substrate, or another where the metals are deposited through low pressure chemical vapor deposition (LPCVD). However, LPCVD deposition requires expensive equipment. Moreover, metal coil is lacking in flexibility which blocks certain frequencies of the diaphragm.

More recently, two-dimensional material have been heavily researched due to their unique properties and ability to be used in numerous fields, including speakers. Recently, single layer graphene has been demonstrated as the conductive material in loudspeakers and thermoacoustic transducers. However, electromagnetic speakers have not yet been developed due to a lack of conductivity of graphene-based materials.

There is a need for additional, more tunable materials for use in applications comprising voice coils and the devices that employ these voice coils.

SUMMARY

The present disclosure is directed to the use of MXenes in such applications. MXenes offer the promise for expanding the materials list beyond existing materials in voice coil applications. Since their discovery in 2011, most of the applications of MXenes focus on energy storage systems and their catalytic properties due to their rich surface chemistries and high electronic conductivities. For example, the two-dimensional titanium carbide MXene $Ti_3C_2$ exhibits the highest electrical conductivity values among 2D materials which gives it an advantage over graphene. Further, because MXenes tend to be hydrophilic, they can be dispersed in aqueous media and can be applied by various conventional methods, including spin coating, spray coating, drop casting. MXenes can be stored in dispersions and then sprayed onto a substrate. This allows for design flexibility by spraying through a stencil, or directly onto a laser-cut substrate. These provide means for depositing MXene material, both areally and in patterns, much less expensively than metal vapor deposition methods.

Embodiments of the present invention(s) include voice coils comprising MXene materials, devices incorporating such voice coils on biaxially oriented polymers, speakers comprising these devices, and acoustic devices comprising these speakers/transmitters.

Additional embodiments includes methods of making these articles. These methods are described additionally herein.

Certain embodiments of the present invention embrace voice coils comprising a patterned MXene composition attached to a biaxially oriented polyaromatic polymer film. In related embodiments, these voice coils are incorporated into speakers and systems employing these speakers. It should be appreciated that these speakers and the incorporating systems are also considered to be separate embodiments of the present disclosure.

The MXene component of these nanocomposites can be any of the compositions described in any one of U.S. patent application Ser. No. 14/094,966, International Applications PCT/US2012/043273, PCT/US2013/072733, PCT/US2015/051588, PCT/US2016/020216, or PCT/US2016/028,354. Specific such compositions are described elsewhere herein. In certain preferred embodiments, the MXenes comprise substantially two-dimensional array of crystal cells, each crystal cell having an empirical formula of $M_{n+1}X_n$, or $M'_2M''_nX_{n+1}$, where M, M', M", and X are defined elsewhere herein. Those descriptions are incorporated here. In some independent embodiments, M is Ti or Ta. Additionally, or alternatively, X is C. The specification exemplifies the use of $Ti_3C_2T_x$.

Additionally, and/or alternatively, in certain embodiments, the biaxially oriented polyaromatic polymer film comprises a polyester, a polyphenylene oxide, a polyamide, or a polyphenylene sulfide. In more specific embodiments, the biaxially oriented polyaromatic polymer film further comprises polyethylene terephthalate, polyethylenenaphthalate, or a polyphthalamide.

In certain embodiments, the voice coil is patterned in a spiral or serpentine pattern. Additionally, and/or alternatively, in some embodiments, the voice coil is patterned in double Archimedean coil.

The disclosure also embraces those embodiments comprising a planar electrical device comprising the voice coil positioned within a frame.

The disclosure also embraces those embodiments comprising an active acoustic device for receiving or transmitting acoustic waves, the active acoustic device comprising one or more of the voice coils or planar electrical devices otherwise disclosed herein. Such active acoustic device may further comprise two or more magnets positioned proximate to the voice coil. Additionally, or alternatively, the active acoustic device is a microphone. Additionally, or alternatively, the active acoustic device is independently an electrostatic speaker, an electroacoustic transducer, a thermoacoustic transducer, or a planar speaker.

The disclosure also provides methods of making any of the voice coils described herein, the methods comprising spray-coating, spin coating, or roller coating a layer of MXene onto the biaxially oriented polyaromatic polymer film. The MXene compositions may be applied as a pattern by masking techniques. Additionally, and/or alternatively the MXene compositions may be applied as a pattern by direct-writing techniques. Additionally, and/or alternatively the MXene compositions may be applied as a pattern by applying at least one layer of MXene composition onto the biaxially oriented polyaromatic polymer film and removing at least a portion of the applied MXene composition by wet or plasma or laser etching techniques to form a MXene pattern on the biaxially oriented polyaromatic polymer film.

This disclosure also embraces methods of operating the voice coils, planar devices, or active acoustic systems. In individual embodiments, the methods comprise passing an alternating current through the patterned MXene composition.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The present application is further understood when read in conjunction with the appended drawings. For the purpose of illustrating the subject matter, there are shown in the drawings exemplary embodiments of the subject matter; however, the presently disclosed subject matter is not limited to the specific methods, devices, and systems disclosed. In addition, the drawings are not necessarily drawn to scale.

DETAILED DESCRIPTION OF ILLUSTRATIVE EMBODIMENTS

The present invention is directed to methods for preparing acoustic speakers and transmitters, devices comprising such speakers and transmitters, and methods for making the same.

The embodiments take advantage of the certain characteristics of MXenes, including their high strength and electric conductivities (in some cases metallic), and hydrophilicities, and the ease of syntheses and a dispersibility and application to substrates, both in their own right, but especially when compared to other 2D materials. MXenes can be stored in dispersions and then sprayed onto a substrate, allowing for design flexibility by spraying through a stencil, areal spraying and subsequent etching, or direct writing onto a laser-cut substrate. Herein is reported how these materials and their properties were used and can be used to build MXene planar magnetic loudspeakers. These loudspeakers were characterized where characterized by their electrical conductivity, impedance, and sound pressure level measurements. While the planar magnetic MXene speaker generated an audible sound in the frequency range from 125-16,000 Hz, other market products can operate over the range 20-20,000 Hz range. One of the most promising characteristics regarding MXenes in application to a planar magnetic speaker are their abilities to be stored in a dispersion and sprayed, while also exhibiting a low density compared to copper and aluminum.

Embodiments of the present disclosure include voice coils comprising patterned MXene compositions attached to biaxially oriented polyaromatic polymer films.

Figure 1:
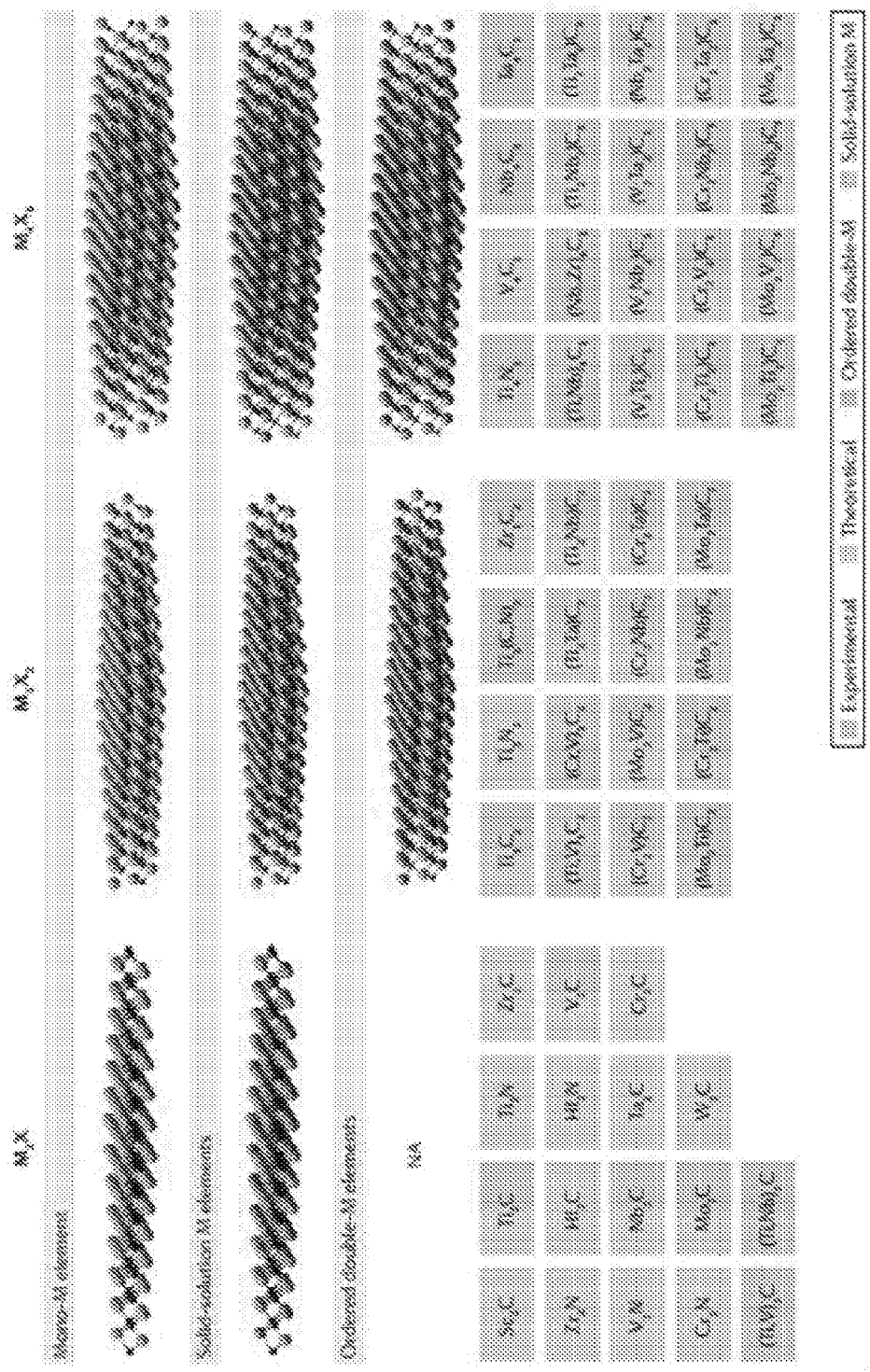
FIG. 1 is a schematic representation of reported MXene compositions—three main formulae are found ($M_2X$, $M_3X_2$ and $M_4X_3$).

MXenes are known in the art to include nanosheet compositions comprising substantially two-dimensional array of crystal cells having the general formulae $M_2X$, $M_3X_2$ and $M_4X_3$ (FIG. 1). The MXene compositions described herein are also sometimes described in terms of the phrase "MXenes" or "MX-ene compositions." Most of the MXenes synthesized to date have metallic conductivity. For example, the two-dimensional titanium carbide, $Ti_3C_2T_x$, which is the mostly studied MXene, has conductivity in the range of $10^3$-$10^4$ S cm$^{-1}$ for both individual flakes as well as in the stacked films (typically conductivities up to ~6000-11000 S/cm). MXenes have shown great promise for a variety of applications including energy storage, electromagnetic interference shielding, sensors, water purifications, and medicine.

In some embodiments, MXenes are described as two-dimensional transition metal carbides, nitrides, or carbonitrides comprising at least one layer having first and second surfaces, each layer described by a formula $M_{n+1}X_nT_x$ and comprising:

a substantially two-dimensional array of crystal cells, each crystal cell having an empirical formula of $M_{n+1}X_n$, such that each X is positioned within an octahedral array of M, wherein M is at least one Group IIIB, IVB, VB, or VIB metal, wherein each X is C, N, or a combination thereof;

n=1, 2, or 3; and wherein $T_x$ represents surface termination groups.

These so-called MXene compositions have been described in U.S. Pat. No. 9,193,595 and Application PCT/US2015/051588, filed Sep. 23, 2015, each of which is incorporated by reference herein in its entirety at least for its teaching of these compositions, their (electrical) properties, and their methods of making. That is, any such composition described in this patent is considered as applicable for use in the present applications and methods and within the scope of the present invention. For the sake of completeness, M can be at least one of Sc, Y, Lu, Ti, Zr, Hf, V, Nb, Ta, Cr, Mo, or W. In certain embodiments in this class, M is at least one Group IVB, Group VB, or Group VIB metal, preferably Ti, Mo, Nb, V, or Ta. Certain of these compositions include those having one or more empirical formula wherein $M_{n+1}X_n$ comprises $Sc_2C$, $Ti_2C$, $V_2C$, $Cr_2C$, $Cr_2N$, $Zr_2C$, $Nb_2C$, $Hf_2C$, $Ti_3C_2$, $V_3C_2$, $Ta_3C_2$, $Ti_4C_3$, $V_4C_3$, $Ta_4C_3$, $Sc_2N$, $Ti_2N$, $V_2N$, $Cr_2N$, $Cr_2N$, $Zr_2N$, $Nb_2N$, $Hf_2C$, $Ti_3N_2$, $V_3C_2$, $Ta_3C_2$, $Ti_4N_3$, $V_4C_3$, $Ta_4N_3$ or a combination or mixture thereof. In particular embodiments, the $M_{n+1}X_n$ structure comprises $Ti_3C_2$, $Ti_2C$, $Ta_4C_3$ or $(V_{1/2}Cr_{1/2})_3C_3$. In some embodiments, M is Ti or Ta, and n is 1, 2, or 3, for example having an empirical formula $Ti_3C_2$ or $Ti_2C$. In some of these embodiments, at least one of said surfaces of each layer has surface terminations comprising hydroxide, oxide, sub-oxide, or a combination thereof. In certain preferred embodiments, the MXene composition is described by a formula $M_{n+1}X_nT_x$, where $M_{n+1}X_n$ are $Ti_2CT_x$, $Mo_2TiC_2T_x$, $Ti_3C_2T_x$, or a combination thereof, and $T_x$ is as described herein. Those embodiments wherein M is Ti, and n is 1 or 2, preferably 2, are especially preferred.

Additionally, or alternatively, the articles of manufacture and methods use compositions, wherein the two-dimensional transition metal carbide, nitrides, or carbonnitride comprises a composition having at least one layer having first and second surfaces, each layer comprising:

a substantially two-dimensional array of crystal cells, each crystal cell having an empirical formula of $M'_2M''_nX_{n+1}$, such that each X is positioned within an octahedral array of M' and M'', and where $M''_n$ are present as individual two-dimensional array of atoms intercalated (sandwiched) between a pair of two-dimensional arrays of M' atoms, wherein M' and M'' are different Group IIIB, IVB, VB, or VIB metals (especially where M' and M'' are Ti, V, Nb, Ta, Cr, Mo, or a combination thereof), wherein each X is C, N, or a combination thereof, preferably C; and n=1 or 2.

These compositions are described in greater detail in Application PCT/US2016/028354, filed Apr. 20, 2016, which is incorporated by reference herein in its entirety at least for its teaching of these compositions and their methods of making. For the sake of completeness, in some embodiments, M' is Mo, and M'' is Nb, Ta, Ti, or V, or a combination thereof. In other embodiments, n is 2, M' is Mo, Ti, V, or a combination thereof, and M'' is Cr, Nb, Ta, Ti, or V, or a combination thereof. Instill further embodiments, the empirical formula $M'_2M''_nX_{n+1}$ comprises $Mo_2TiC_2$, $Mo_2VC_2$, $Mo_2TaC_2$, $Mo_2NbC_2$, $Mo_2Ti_2C_3$, $Cr_2TiC_2$, $Cr_2VC_2$, $Cr_2TaC_2$, $Cr_2NbC_2$, $Ti_2NbC_2$, $Ti_2TaC_2$, $V_2TaC_2$, or $V_2TiC_2$, preferably $Mo_2TiC_2$, $Mo_2VC_2$, $Mo_2TaC_2$, or $Mo_2NbC_2$, or their nitride or carbonitride analogs. In still other embodiments, $M'_2M''_nX_{n+1}$ comprises $Mo_2Ti_2C_3$, $Mo_2V_2C_3$, $Mo_2Nb_2C_3$, $Mo_2Ta_2C_3$, $Cr_2Ti_2C_3$, $Cr_2V_2C_3$, $Cr_2Nb_2C_3$, $Cr_2Ta_2C_3$, $Nb_2Ta_2C_3$, $Ti_2Nb_2C_3$, $Ti_2Ta_2C_3$, $V_2Ta_2C_3$, $V_2Nb_2C_3$, or $V_2Ti_2C_3$, preferably $Mo_2Ti_2C_3$, $Mo_2V_2C_3$, $Mo_2Nb_2C_3$, $Mo_2Ta_2C_3$, $Ti_2Nb_2C_3$, $Ti_2Ta_2C_3$, or $V_2Ta_2C_3$, or their nitride or carbonitride analogs.

Each of these compositions having empirical crystalline formulae $M_{n+1}X_n$ or $M'_2M''_nX_{n+1}$ are described in terms of comprising at least one layer having first and second surfaces, each layer comprising a substantially two-dimensional array of crystal cells. In some embodiments, these compositions comprise layers of individual two-dimensional cells. In other embodiments, the compositions comprise a plurality of stacked layers. Additionally, in some embodiments, at least one of said surfaces of each layer has surface terminations (optionally designated "$T_s$" or "$T_x$" or "$T_z$") comprising alkoxide, carboxylate, halide, hydroxide, hydride, oxide, sub-oxide, nitride, sub-nitride, sulfide, thiol, or a combination thereof. In some embodiments, at least one of said surfaces of each layer has surface terminations comprising alkoxide, fluoride, hydroxide, oxide, sub-oxide, or a combination thereof. In still other embodiments, both surfaces of each layer have said surface terminations comprising alkoxide, fluoride, hydroxide, oxide, sub-oxide, or a combination thereof. As used herein the terms "sub-oxide," "sub-nitride," or "sub-sulfide" is intended to connote a composition containing an amount reflecting a sub-stoichiometric or a mixed oxidation state of the M metal at the surface of oxide, nitride, or sulfide, respectively. For example, various forms of titania are known to exist as $TiO_x$, where x can be less than 2. Accordingly, the surfaces of the present invention may also contain oxides, nitrides, or sulfides in similar sub-stoichiometric or mixed oxidation state amounts.

In the present disclosure, these MXenes may comprise simple individual layers, a plurality of stacked layers, or a combination thereof. Each layer may independently comprise surfaces functionalized by any of the surface coating features described herein (e.g., as in alkoxide, carboxylate, halide, hydroxide, hydride, oxide, sub-oxide, nitride, sub-nitride, sulfide, thiol, or a combination thereof) or may be also partially or completely functionalized by polymers, either on the surface of individual layers, for example, where the two-dimensional compositions are embedded within a polymer matrix, or the polymers may be intercalated between layers to form structural composites, or both.

In certain applications, the MXene surface coatings can be adjusted to range from hydrophobic to hydrophilic, depending on post-synthesis treatment regimes. As prepared, MXene surfaces tend to be hydrophilic. In the present application, hydrophilic coatings are preferred. The reasons for this are described elsewhere herein. In some cases, these hydrophilic coatings can react with reactive surface groups of certain substrates, allowing both for strong bonding attachments to substrate surfaces. This hydrophilicity of MXenes is in sharp contrast to the hydrophobic surfaces of graphene. This simplifies processing of the conductive material, as graphene powder must first be functionalized to become hydrophilic. Further, Cu also does not form an aqueous dispersion, and is therefore limited in its application when designing speakers to being molded or vapor deposited.

As is discussed elsewhere herein, the electrical conductivity of MXenes are especially suitable for their use in voice coil applications. The materials currently considered for use as a conductive material when designing a voice coil trace are either Cu or Al. When comparing the most common and widely investigated MXene, $Ti_3C_2T_x$, to these two metals, the important values to look at are density and conductivity, shown in Table 1. The density of $Ti_3C_2T_x$ is the lowest of the three, while the conductivity is an order of magnitude lower.

TABLE 1

Density, conductance, and resistance of voice coil trace materials

| Material | Density (g/cm$^3$) | Electrical Conductivity (S/cm) |
| --- | --- | --- |
| Copper [12] | 8.92 | 5.96E+5 |
| Aluminum [13] | 2.7 | 3.77E+5 |
| $Ti_3C_2T_x$ (spray coated) | 2.11 | 1.1E+4 |

The density-to-conductivity ratio is important to look at due to the need to move the diaphragm in accordance with the AC current. A lower diaphragm mass allows for it to be more easily moved, while it is important to match the impedance of the overall system. Impedance, measured in ohms ($\Omega$), is the resistance of the material summed with reactance. As AC current can have various frequencies, impedance changes depending on the frequency that the AC current is held at. Impedance can be described by Equation 1 below, where Z stands for impedance, R for resistance, j denotes the imaginary aspect of the variable, and X is reactance:

$$Z = R + jX \quad (1)$$

$$R = V/I = \mu l/A \quad (2)$$

$$G = I/V = \sigma A/l \quad (3)$$

$$k = F/\delta \quad (4)$$

Resistance and conductance are also important to consider when discussing how impedance affects speaker performance. Resistance is defined above in Equation 2, where V stands for voltage, I for current, for resistivity, l for length, and A for area. Conductance, measured in Siemens (S), is the inverse quality of resistance, as described in Equation 3, and is ultimately the driving force for how easy it is to make the diaphragm vibrate and oscillate, where G stands for conductance, and $\sigma$ is conductivity. Stiffness is an important property as well when considering the diaphragm, as it must be able to displace air easily. Equation 4 describes stiffness, where k stands for stiffness, F for force, and $\delta$ is the displacement produced by the force.

In the present applications directed to voice coils, these MXene compositions are applied and adhere to polymer films, together forming the voice coil diaphragm, which is integral to the design of an acoustical device, for example, a speaker. The polymers chosen to form the voice coil diaphragm (i.e., comprising the biaxially oriented polyaromatic polymer film to which the voice coil is attached) need to be lightweight and stiff to prevent sound wave damping. When damping is minimized, electric potential energy is translated to sound more effectively. Ideally, an audio transduction diaphragm, a membrane that converts energy into sound, should have a low spring constant, low mass, high stiffness, and be able to displace air efficiently. Additionally, as the diaphragm is a mechanical component that undergoes continuous oscillation, it must be resistant to fatigue. It is shown herein the biaxially oriented polyaromatic polymer film work well in this capacity. The term "biaxially oriented polyaromatic polymer film" refers to those polymers comprising aromatic moieties that can align in stacked arrangements, especially when the polymers subjected to stretching stresses. Such biaxially oriented polyaromatic polymer films can, in some cases, can be described as liquid crystal type materials. In such cases, the robust mechanical characteristics and the electrical conductivity of the MXenes complement the electrical, physical, and mechanical characteristics of the biaxially oriented polyaromatic polymer film. In certain embodiments, these voice coils comprise MXenes applied and adhered to an aromatic polyamide, an aromatic polyester, a polyphenylene oxide, or a polyphenylene sulfide. In specific embodiments, these polyaromatic polymers include polyethylene terephthalate, polyethylenenaphthalate, or a polyphthalamide. The use of polyester films is exemplified in the Examples in this disclosure.

As shown in the Examples herein, both the MXenes and the polymers forming the electromechanical voice coil coupled with a diaphragm can resist the mechanical fatigue associated with these voice coils when in use, and each plays an important role in the performance of voice coils and acoustical devices of the present disclosure.

Owing to the general hydrophilicity of these surface coatings, MXenes are typically dispersible in water or aqueous solutions, and may be applied to surfaces using aqueous solutions. Additionally, or alternatively, the MXene compositions are mechanically robust, and can exist either attached to substrates or as stand-alone, self-supporting films. In the presently described devices and applications, use of water dispersible MXenes is an attractive aspect, as it serves as a cheaper alternative to vapor deposition of a metal, which requires expensive equipment. When creating a design for the voice coil trace, it could potentially be printed out or laser cut and then sprayed with an airbrush.

As mentioned elsewhere herein, the bonding of MXenes to substrate surfaces can be enhanced by chemical interactions with substrate surfaces. As such, in certain embodiments, the polyaromatic polymer used to make the films may be functionalized with groups suitable to enhance the attachment modes of the MXenes. Additionally, or alternatively, in some embodiments, the polyaromatic polymer films may be surface treated, for example with plasma, to enhance the activity of these surfaces to accept the MXene materials. In either or both cases, the substrate surface energy is an important property to consider as the application of MXene requires spraying the dispersion onto a substrate. Thus, a lower water contact angle is an indication of greater wetting. Ideally, the perfect material for a substrate would demonstrate excellent wettability, low spring constant, and low density. In some embodiments, the biaxially oriented polyaromatic polymer films exhibits as contact angle with distilled water of 60° or less, 50° or less, 40° or less, 30° of less, or 20° or less.

In addition to the importance of the electrical and mechanical aspects of the disclosed voice coils, the design of the voice coil trace itself is critical to the performance of the voice coil. Typically, the voice coil trace is designed to maximize the coverage of the diaphragm, and the magnetic flux density while accounting for the impedance values. Harman International's design maximized the square diaphragm shape. The gaps created by their serpentine pattern are where they place their magnets in an attempt to maximize the magnetic flux density and magnetic force. See M. Asarisabet, et al., "COMOL Multiphysics® Simulation of Electro Dynamic Planar Loudspeaker (EDPL)," HARMAN International, Lifestyle Division, Novi, Mich., which is incorporated by reference for all purposes, but at least for the design of the voice coil design.

Figure 9:
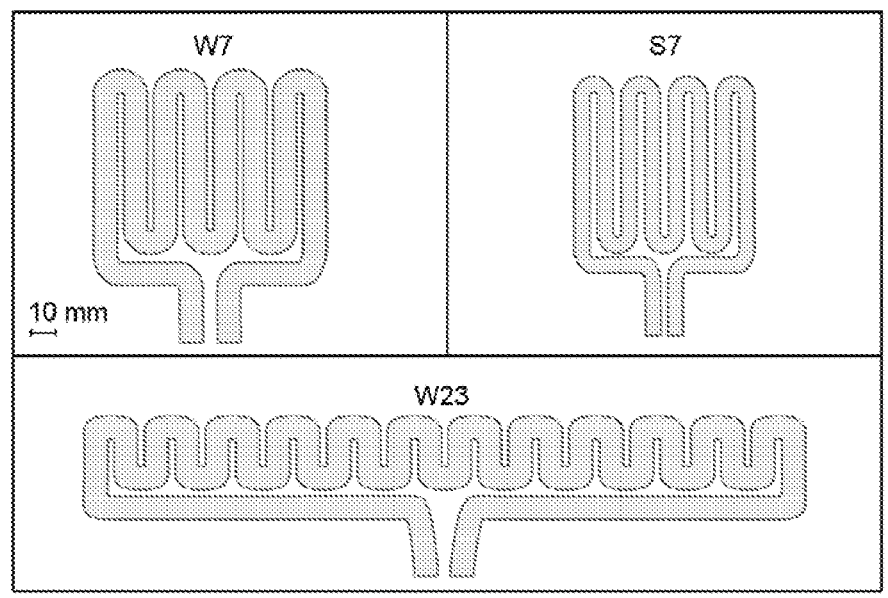
FIG. 9 shows several serpentine trace designs used in the Examples.

In certain additional, or alternative, embodiments, the voice coil voice coil is patterned in a spiral or serpentine pattern (see Example 2.8, FIG. 9 for exemplary designs). Additionally, and/or alternatively, in some embodiments, the voice coil is patterned in double Archimedean coil (see Example 2.1, FIG. 4 for exemplary designs). As is understood by the skilled artisan, the Archimedean coil or spiral (also known as the arithmetic spiral) is the locus of points corresponding to the locations over time of a point moving away from a fixed point with a constant speed along a line that rotates with constant angular velocity. Equivalently, in polar coordinates (r, θ) it can be described by the equation $$r=a+b\theta$$

with real numbers a and b.

Voice coils tend to be as lightweight as possible and MXenes, being a 2D material, fit well with that requirement. Ribbon-shaped wires are used to produce a higher magnetic flux as it provides a higher packing density than cylindrical wires. For this reason, a thin spray coating of MXene can provide an even higher packing density than conventional materials.

Devices Comprising the Disclosed Voice Coils

In additional embodiments of the present disclosure, the disclosed voice coils can be incorporated into certain acoustical devices. While the materials described herein are novel and non-obvious, the architecture of such devices are known, For example, in some embodiments, the disclosed the voice coil are positioned within a frame, thereby forming a planar electrical device. Such devices are described elsewhere herein.

Figure 10:
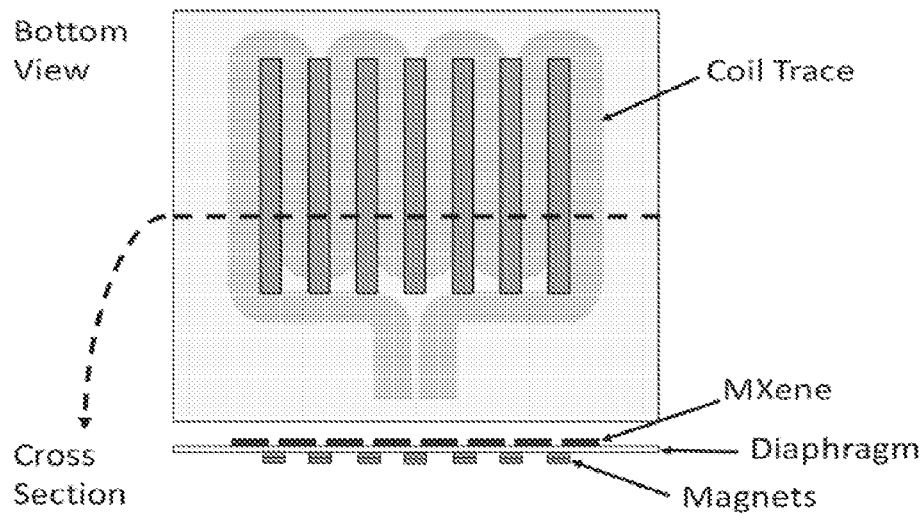
FIG. 10 shows a magnet array used in the Examples.

In another example, in some embodiments, the disclosed the voice coil is incorporated into an active acoustic device for receiving or transmitting acoustic waves. In some of these embodiments, the active acoustic device a planar electrical device described herein. In yet another example, additionally the active acoustic device optionally comprises two or more magnets positioned proximate to the voice coil. The relative positioning of these magnets, relative to the voice coils are known in the art, and are exemplified elsewhere herein (see, e.g., FIG. 2 and FIG. 10).

Additionally, or alternatively, in some embodiments, the active acoustic device is a microphone.

Additionally, or alternatively, in some embodiments, the active acoustic device is an electrostatic speaker, an electroacoustic transducer, a thermoacoustic transducer, or a planar speaker. Additionally, or alternatively, in some embodiments, the active acoustic device is a conventional cone loudspeaker, a planar magnetic loudspeaker, or an electrostatic loudspeaker.

Current market loudspeakers fall into one of three types: conventional cone (also known as dynamic driver), planar magnetic, and electrostatic. Conventional cone loudspeakers rely on a vibrating cone to produce sound, which is typically held together with glue to the voice coil. The conical shape amplifies the acoustic signal produced. Conventional cone speakers are the most common product because they are cheap to produce. In terms of sound quality and price, electrostatic speakers are the best and most expensive, followed by planar magnetic speakers, and then conventional cone speakers.

As opposed to a cone shaped diaphragm, electrostatic and planar magnetic speakers work by vibrating an extremely thin, flat diaphragm. The flat diaphragm is held together with a frame, which reduces the amount of fatigue points, as opposed to the conventional cone speaker where the diaphragm is bound together at the apex of the cone. The flat diaphragm also allows for heat to be dissipated more evenly as opposed to the voice coil found in conventional cone speakers. Electrostatic speakers are driven by an electric field moving the thin, electrically charged diaphragm via attraction of opposing charges, whereas planar magnetic speakers are driven by a magnetic field moving the electromagnetic diaphragm. In an electrostatic speaker, the diaphragm is typically made of a polymer, such as polyethylene teraphthalate, with a thin film of conductive material deposited onto it. The diaphragm is held together by two electrodes that control how the thin film is vibrated through manipulation of the electric field.

Figure 2:
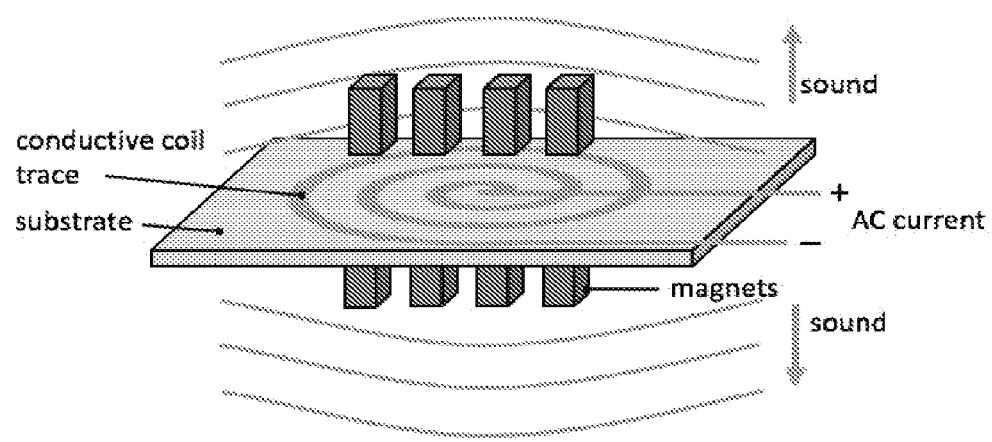
FIG. 2 shows a schematic representation of a planar magnetic speaker.

Planar magnetic speakers, also known as isodynamic or orthodynamic speakers, such as shown below in FIG. 2 are exemplified in this disclosure. A voice coil trace serves the same function as the voice coil in a conventional cone speaker, but the conductive trace is embedded into the diaphragm of the planar magnetic setup.

Methods of Making and Using the Disclosed Voice Coils

To this point, the disclosure has focused on voice coils, the materials used in these voice coils, and devices comprising these voice coils. It is also in the spirit of the present disclosure to embrace the methods of making and using these voice coils and acoustic devices.

As described elsewherein, MXenes are conducive and suitable for dispersing in aqueous (and non-aqueous) solvents, which make them suitable for any method of applying liquid coatings. In certain embodiments, a voice coil as described herein may be prepared by a method comprising spray-coating, spin coating, dip coating, or roller coating a layer of MXene onto the biaxially oriented polyaromatic polymer film. The voice coil pattern may be achieved by masking techniques; i.e., spraying a solution of MXene materials through a patterned mask onto the polymer film substrate. Additionally, or alternatively, in certain embodiments, the method comprises applying at least one layer of MXene composition areally (i.e., in a non-patterned area) onto the biaxially oriented polyaromatic polymer film and removing at least a portion of the applied MXene composition by wet or plasma or laser etching techniques to form a MXene pattern on the biaxially oriented polyaromatic polymer film.

In additional, or alternative embodiments, the method MXene may be applied in a method comprising direct writing a solution of MXene onto the polymer film Further, this disclosure embraces methods of using these voice coils or devices comprising these voice coils. Certain embodiments, then, include those methods of operating any of the voice coils, the planar electric devices, or active active acoustic devices described herein, the methods comprising passing an alternating current through the patterned MXene composition.

Still further, these voice coils, the planar electric devices, or active acoustic devices may also be characterized by any of the properties attributed to them, either alone or in conjunction with the structural definitions provided herein. For example (but not intending to be limited to this example), in certain embodiments, the voice coils or associated devices may be characterized by their sound pressure levels (e.g., in dB), as coincident to the inverse of perceived human hearing, showing sound pressure levels, in dB, in a range of from about 500 dB to 1000 dB, from about 1000 dB to about 2000 dB, from about 2000 dB to about 3000 dB, from about 3000 dB to about 4000 dB, from about 4000 dB to about 5000 dB, from about 5000 dB to about 6000 dB, from about 6000 dB to about 7000 dB, from about 7000 dB to about 8000 dB, or in a range defined by two or more of these foregoing ranges, for example, from about 2000 dB to about 7000 dB. When evaluating speakers, or other active acoustic devices, it is important to take into context how the listener perceives the output sound. Humans typically hear certain frequencies more sensitively than others. Evolution allowed humans to hear more sensitively in the 2-7 kHz frequencies than any other frequency. This means that a loudspeaker output sound pressure level, SPL, should have to follow the inverse curve of perceived human hearing.

Related to how humans hear different frequencies more sensitively than others, there also exists equal-loudness contours, where the sound pressure (dB SPL) across the audible frequency spectrum that the listener perceives a constant steady loudness. See, e.g., R. Nave, "Features of Equal Loudness Curves", Hyperphysics.phy-asir.gsu.edu, 2018. [Online]. Available: http://hyperphysics.phy-astr.gs-u.edu/hbase/Sound/earcrv.html. [Accessed: 19 Mar. 2018], which is incorporated by reference herein for all purposes, or at least for these acoustical characteristics of human hearing.

General Terms

In the present disclosure the singular forms "a," "an," and "the" include the plural reference, and reference to a particular numerical value includes at least that particular value, unless the context clearly indicates otherwise. Thus, for example, a reference to "a material" is a reference to at least one of such materials and equivalents thereof known to those skilled in the art.

When a value is expressed as an approximation by use of the descriptor "about," it will be understood that the particular value forms another embodiment. In general, use of the term "about" indicates approximations that can vary depending on the desired properties sought to be obtained by the disclosed subject matter and is to be interpreted in the specific context in which it is used, based on its function. The person skilled in the art will be able to interpret this as a matter of routine. In some cases, the number of significant figures used for a particular value may be one non-limiting method of determining the extent of the word "about." In other cases, the gradations used in a series of values may be used to determine the intended range available to the term "about" for each value. Where present, all ranges are inclusive and combinable. That is, references to values stated in ranges include every value within that range.

It is to be appreciated that certain features of the invention which are, for clarity, described herein in the context of separate embodiments, may also be provided in combination in a single embodiment. That is, unless obviously incompatible or specifically excluded, each individual embodiment is deemed to be combinable with any other embodiment(s) and such a combination is considered to be another embodiment. Conversely, various features of the invention that are, for brevity, described in the context of a single embodiment, may also be provided separately or in any sub-combination. Finally, while an embodiment may be described as part of a series of steps or part of a more general structure, each said step may also be considered an independent embodiment in itself, combinable with others.

Those features and descriptions associated with or attributed to the voice coil compositions themselves, and the components thereof, are also attributable to the methods of making and using these voice coils, and vice versa.

The transitional terms "comprising," "consisting essentially of," and "consisting" are intended to connote their generally in accepted meanings in the patent vernacular; that is, (i) "comprising," which is synonymous with "including," "containing," or "characterized by," is inclusive or open-ended and does not exclude additional, unrecited elements or method steps; (ii) "consisting of" excludes any element, step, or ingredient not specified in the claim; and (iii) "consisting essentially of" limits the scope of a claim to the specified materials or steps and those that do not materially affect the basic and novel characteristic(s) of the claimed invention. Embodiments described in terms of the phrase "comprising" (or its equivalents), also provide, as embodiments, those which are independently described in terms of "consisting of" and "consisting essentially of." For those composition embodiments provided in terms of "consisting essentially of," the basic and novel characteristic(s) is the ability to provide the described effect associated with the description as described herein or as explicitly specified.

When a list is presented, unless stated otherwise, it is to be understood that each individual element of that list, and every combination of that list, is a separate embodiment. For example, a list of embodiments presented as "A, B, or C" is to be interpreted as including the embodiments, "A," "B," "C," "A or B," "A or C," "B or C," or "A, B, or C."

Throughout this specification, words are to be afforded their normal meaning, as would be understood by those skilled in the relevant art. However, so as to avoid misunderstanding, the meanings of certain terms will be specifically defined or clarified.

The terms "MXenes" or "two-dimensional (2D) crystalline transition metal carbides" or two-dimensional (2D) transition metal carbides" may be used interchangeably to refer collectively to compositions described herein as comprising substantially two-dimensional crystal lattices of the general formulae $M_{n+1}X_n(T_s)$, $M_2A_2X(T_s)$. and $M'_2M''_nX_{n+1}(T_s)$, where M, M', M'', A, X, and $T_s$ are defined herein. Supplementing the descriptions herein, $M_{n+1}X_n(T_s)$ (including $M'_2M''_mX_{m+1}(T_s)$ compositions) may be viewed as comprising free standing and stacked assemblies of two dimensional crystalline solids. Collectively, such compositions are referred to herein as "$M_{n+1}X_n(T_s)$," "MXene," "MXene compositions," or "MXene materials." Additionally, these terms "$M_{n+1}X_n(T_s)$," "MXene," "MXene compositions," or "MXene materials" can also independently refer to those compositions derived by the chemical exfoliation of MAX phase materials, whether these compositions are present as free-standing 2-dimensional or stacked assemblies (as described further below). These compositions may be comprised of individual or a plurality of such layers. In some embodiments, the MXenes comprising stacked assemblies may be capable of, or have atoms, ions, or molecules, that are intercalated between at least some of the layers. In other embodiments, these atoms or ions are lithium.

The term "crystalline compositions comprising at least one layer having first and second surfaces, each layer comprising a substantially two-dimensional array of crystal cells" refers to the unique character of these materials. For purposes of visualization, the two-dimensional array of crystal cells may be viewed as an array of cells extending in an x-y plane, with the z-axis defining the thickness of the composition, without any restrictions as to the absolute orientation of that plane or axes. It is preferred that the at least one layer having first and second surfaces contain but a single two-dimensional array of crystal cells (that is, the z-dimension is defined by the dimension of approximately one crystal cell), such that the planar surfaces of said cell array defines the surface of the layer; it should be appreciated that real compositions may contain portions having more than single crystal cell thicknesses.

That is, as used herein, "a substantially two-dimensional array of crystal cells" refers to an array which preferably includes a lateral (in x-y dimension) array of crystals having a thickness of a single unit cell, such that the top and bottom surfaces of the array are available for chemical modification.

The following listing of Embodiments is intended to complement, rather than displace or supersede, the previous descriptions.

Embodiment 1. A voice coil comprising, consisting essentially of, or consisting of a patterned MXene composition attached to a biaxially oriented polyaromatic polymer film. In this sense, the basic and novel characteristic of the MXene composition is to provide sufficient conductivity to generate an electric field when subjected to an alternating electric current in the presence of a magnetic field.

Embodiment 2. The voice coil of Embodiment 1, wherein the MXene composition comprises a composition comprising at least one layer having first and second surfaces, each layer described by a formula $M_{n+1}X_nT_x$ and comprising:

a substantially two-dimensional array of crystal cells, each crystal cell having an empirical formula of $M_{n+1}X_n$, such that each X is positioned within an octahedral array of M, wherein M is at least one Group IIIB, IVB, VB, or VIB metal, wherein each X is C, N, or a combination thereof;

n=1, 2, or 3; and wherein $T_x$ represents surface termination groups.

Embodiment 3. The voice coil of Embodiment 2, wherein the MXene composition comprises a plurality of stacked layers Embodiment 4. The voice coil of Embodiment 2 or 3, wherein at least one of said surfaces of each layer has surface termination groups ($T_x$) comprising alkoxide, carboxylate, halide, hydroxide, hydride, oxide, sub-oxide, nitride, sub-nitride, sulfide, thiol, or a combination thereof Embodiment 5. The voice coil of any one of Embodiments 2 to 4, wherein at least one of said surfaces of each layer has surface terminations comprising alkoxide, fluoride, hydroxide, oxide, sub-oxide, or a combination thereof.

Embodiment 6. The voice coil of any one of Embodiments 2 to 5, wherein both surfaces of each layer have said surface terminations comprising alkoxide, fluoride, hydroxide, oxide, sub-oxide, or a combination thereof.

Embodiment 7. The voice coil of any one of Embodiments 2 to 6, wherein M is at least one Group IVB, Group VB, or Group VIB metal, preferably Ti, Mo, Nb, V, or Ta.

Embodiment 8. The voice coil of any one of Embodiments 1 to 7, wherein the MXene composition is described by a formula $M_{n+1}X_nT_x$, where $M_{n+1}X_n$ are $Ti_2CT_x$, $Mo_2TiC_2T_x$ $Ti_3C_2T_x$, or a combination thereof, and $T_x$ is as described herein.

Embodiment 9. The voice coil of any one of Embodiments 2 to 7, wherein M is Ti, and n is 1 or 2, preferably 2.

Embodiment 10. The voice coil of Embodiment 1, wherein the MXene composition comprises a composition comprising at least one layer having first and second surfaces, each layer comprising:

a substantially two-dimensional array of crystal cells, each crystal cell having an empirical formula of $M'_2M''_nX_{n+1}$, such that each X is positioned within an octahedral array of M' and M'', and where $M''_n$ are present as individual two-dimensional array of atoms intercalated (sandwiched) between a pair of two-dimensional arrays of M' atoms, wherein M' and M'' are different Group IIIB, IVB, VB, or VIB metals (especially where M' and M'' are Ti, V, Nb, Ta, Cr, Mo, or a combination thereof), wherein each X is C, N, or a combination thereof; and n=1 or 2.

Embodiment 11. The voice coil of Embodiment 10, wherein n is 1, M' is Mo, and M'' is Nb, Ta, Ti, or V, or a combination thereof.

Embodiment 12. The voice coil of Embodiment 10 or 11, wherein n is 2, M' is Mo, Ti, V, or a combination thereof, and M'' is Cr, Nb, Ta, Ti, or V, or a combination thereof.

Embodiment 13. The voice coil of any one of Embodiments 10 to 12, wherein $M'_2M''_nX_{n+1}$, comprises $Mo_2TiC_2$, $Mo_2VC_2$, $Mo_2TaC_2$, $M_2NbC_2$, $Mo_2Ti_2C_3$, $Cr_2TiC_2$, $Cr_2VC_2$, $Cr_2TaC_2$, $Cr_2NbC_2$, $Ti_2NbC_2$, $Ti_2TaC_2$, $V_2TaC_2$, or $V_2TiC_2$, or a nitride or carbonitride analog thereof.

Embodiment 14. The voice coil of any one of Embodiments 10 to 13, wherein $M'_2M''_nX_{n+1}$, comprises $Mo_2TiC_2$, $Mo_2VC_2$, $Mo_2TaC_2$, or $Mo_2NbC_2$, or a nitride or carbonitride analog thereof.

Embodiment 15. The voice coil of any one of Embodiments 10 to 14, wherein $M'_2M''_nX_{n+1}$ comprises $Mo_2Ti_2C_3$, $Mo_2V_2C_3$, $Mo_2Nb_2C_3$, $Mo_2Ta_2C_3$, $Cr_2Ti_2C_3$, $Cr_2V_2C_3$, $Cr_2Nb_2C_3$, $Cr_2Ta_2C_3$, $Nb_2Ta_2C_3$, $Ti_2Nb_2C_3$, $Ti_2Ta_2C_3$, $V_2Ta_2C_3$, $V_2Nb_2C_3$, or $V_2Ti_2C_3$, or a nitride or carbonitride analog thereof.

Embodiment 16. The voice coil of any one of Embodiments 10 to 15, wherein $M'_2M''_nX_{n+1}$ comprises $Mo_2Ti_2C_3$, $Mo_2V_2C_3$, $Mo_2Nb_2C_3$, $Mo_2Ta_2C_3$, $Ti_2Nb_2C_3$, $Ti_2Ta_2C_3$, or $V_2Ta_2C_3$, or a nitride or carbonitride analog thereof.

Embodiment 17. The voice coil of any one of Embodiments 10 to 16, wherein the MXene composition comprises a plurality of stacked layers Embodiment 18. The voice coil of any one of Embodiments 10 to 17, wherein at least one of said surfaces of each layer has surface terminations comprising alkoxide, carboxylate, halide, hydroxide, hydride, oxide, sub-oxide, nitride, sub-nitride, sulfide, thiol, or a combination thereof Embodiment 19. The voice coil of any one of Embodiments 10 to 18, wherein at least one of said surfaces of each layer has surface terminations comprising alkoxide, fluoride, hydroxide, oxide, sub-oxide, or a combination thereof Embodiment 20. The voice coil of any one of Embodiments 10 to 19, wherein both surfaces of each layer have said surface terminations comprising alkoxide, fluoride, hydroxide, oxide, sub-oxide, or a combination thereof.

Embodiment 21. The voice coil of any one of Embodiments 1 to 20, wherein the MXene composition is any of the compositions described in any one of U.S. patent application Ser. No. 14/094,966 (filed Dec. 3, 2013), 62/055,155 (filed Sep. 25, 2014), 62/214,380 (filed Sep. 4, 2015), 62/149,890 (filed Apr. 20, 2015), 62/127,907 (filed Mar. 4, 2015) or International Applications PCT/US2012/043273 (filed Jun. 20, 2012), PCT/US2013/072733 (filed Dec. 3, 2013), PCT/US2015/051588 (filed Sep. 23, 2015), PCT/US2016/020216 (filed Mar. 1, 2016), or PCT/US2016/028,354 (filed Apr. 20, 2016), each of which is incorporated by reference at least for its teaching of the compositions and methods of making the same.

Embodiment 22. The voice coil of any one of Embodiments 1 to 21, wherein the biaxially oriented polyaromatic polymer film comprises a polyester, a polyphenylene oxide, a polyamide, or a polyphenylene sulfide.

Embodiment 23. The voice coil of any one of Embodiments 1 to 22, wherein the biaxially oriented polyaromatic polymer film further comprises polyethylene terephthalate, polyethylenenaphthalate, or a polyphthalamide.

Embodiment 24. The voice coil of any one of Embodiments 1 to 23, wherein the voice coil is patterned in a spiral or serpentine pattern Embodiment 25. The voice coil of any one of Embodiments 1 to 24, wherein the voice coil is patterned in double Archimedean coil.

Embodiment 26. A planar electrical device comprising a voice coil of any one of Embodiments 1 to 25, positioned within a frame, preferable as described herein.

Embodiment 27. An active acoustic device for receiving or transmitting acoustic waves comprising the voice coil of any one of Embodiments 1 to 25 or the planar electrical device of Embodiment 26.

Embodiment 28. The active acoustic device of Embodiment 27 further comprising two or more magnets positioned proximate to the voice coil.

Embodiment 29. The active acoustic device of Embodiment 27 or 28 that is a microphone.

Embodiment 30. The active acoustic device of Embodiment 27 or 28 that is an electrostatic speaker, an electroacoustic transducer, a thermoacoustic transducer, or a planar speaker.

Other Aspects of this Embodiment include those acoustic instruments described herein.

Embodiment 32. A method of making the voice coil of any one of Embodiments 1 to 25 comprising spray-coating, spin coating, or roller coating a layer of MXene onto the biaxially oriented polyaromatic polymer film.

Embodiment 33. The method of Embodiment 32, wherein the voice coil is patterned by masking techniques.

Embodiment 34. A method of making the voice coil of any one of Embodiments 1 to 25 comprising applying at least one layer of MXene composition onto the biaxially oriented polyaromatic polymer film and removing at least a portion of the applied MXene composition by wet or plasma or laser etching techniques to form a MXene pattern on the biaxially oriented polyaromatic polymer film.

Embodiment 35. A method of operating a voice coil of any one of claims 1 to 25, the planar electric device of Embodiment 26, or the active acoustic device of any one of Embodiments 27 to 30 comprising passing an alternating current through the MXene composition.

EXAMPLES

The Examples are provided to illustrate some of the concepts described within this disclosure. While each Example is considered to provide specific individual embodiments of composition, methods of preparation and use, none of the Examples should be considered to limit the more general embodiments described herein. In particular, while the examples provided here focus on specific MXene materials, it is believed that the principles described are relevant to other such MXene materials. Accordingly, the descriptions provided here should not be construed to limit the disclosure, and the reader is advised to look to the nature of the claims as a broader description.

In the following examples, efforts have been made to ensure accuracy with respect to numbers used (e.g. amounts, temperature, etc.) but some experimental error and deviation should be accounted for. Unless indicated otherwise, temperature is in degrees C., pressure is at or near atmospheric.

These Examples detail the spraying process and the assembly requirements to build a MXene planar magnetic loudspeakers (PML). In order to understand the capabilities of these structures when applied in acoustic devices, electrical conductivity, impedance, and sound pressure level measurements were taken.

Example 1. Materials

Example 1.1. $Ti_3C_2T_x$ Synthesis

Figure 3:
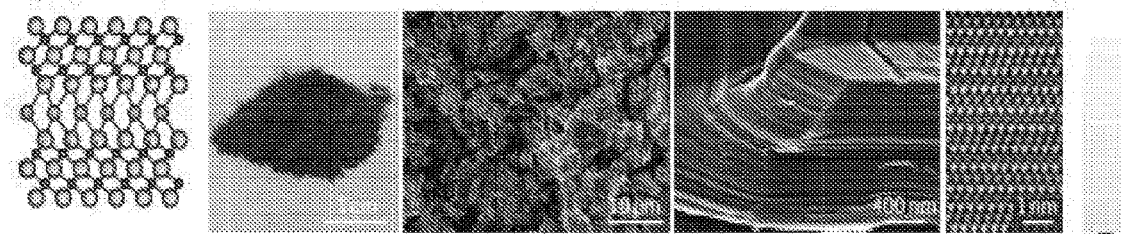
FIG. 3 shows a schematic representation of synthetic processes of layered ternary carbide MAX powder to MXene.
Figure 3:
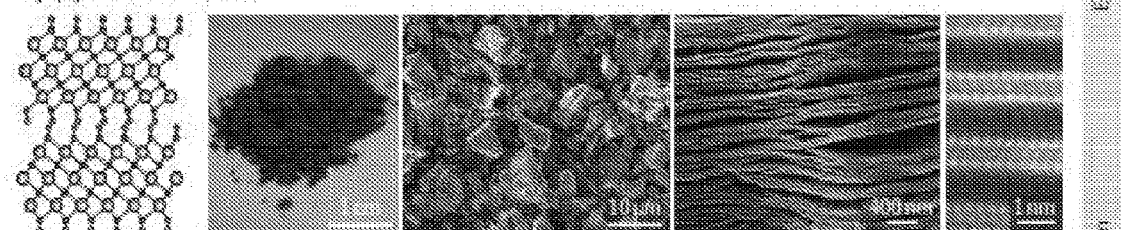
Figure 3:
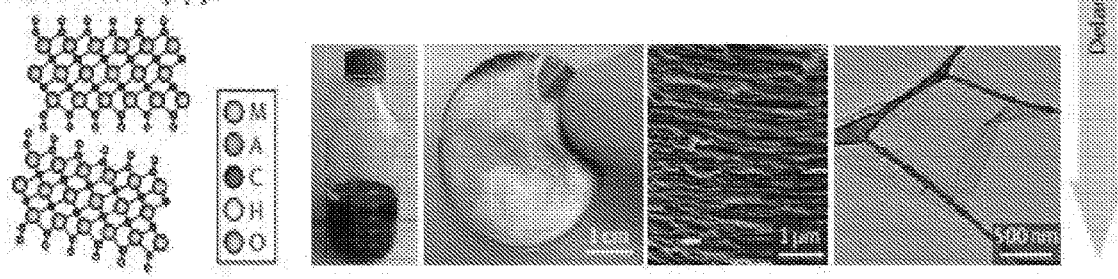

There are various methods of producing $Ti_3C_2T_x$ and some methods result in properties that are desirable for some applications, but not others. FIG. 3 shows a summary of current $Ti_3C_2T_x$ synthesis methods. Using various types of imaging, such as microscopy and SEM, it is possible to track how the MAX phase material changes as it is etched and delaminated into MXene. Methods are split between etching using hydrofluoric acid, HF, and creating HF in situ through a mixture of salts and common acids like HCl.

Current methods of $Ti_3C_2T_x$ synthesis primarily involve LiF in addition to HCl to create HF in situ. $Li^+$ ions are able to intercalate between the layers, leading to exfoliation of the A-layer, and producing 2D nanomaterials, observed above in FIG. 3. While using HF is more dangerous than using LiF and HCl, it allows for a higher percentage yield of MXene, which is more efficient. It is important to wash the suspension with deionized water and then use a centrifuge to separate the MXene from the salt solution. The materials are then sonicated, or lithium ions are added which leads to exfoliation into single nanoflake suspensions. Afterward, the suspension can be vacuum filtered, resulting in the formation of free standing films. The sediment, cleaned from MAX, can be used and "conductive clays" can be created and this form is how most MXenes have been synthesized and characterized. It can also be stored as a dispersion, which can then be used to spray large surface areas.

In these Examples, the method used HF and HCl initially to etch Al, before adding lithium chloride (LiCl) later to intercalate the nanosheets. Etching is typically referred to as a surface phenomenon, but in this context it is the term used to describe the removal of Al in numerous publications about MXenes. To synthesize $Ti_3C_2T_x$ solution, 3 mL of HF acid (48%, Sigma Aldrich) was added with 18 ml of hydrochloric acid (36.5%, Fisher Chemical) to 9 ml of DI water. Three grams of $Ti_3AlC_2$ MAX powder were mixed slowly into the solution. Once all the MAX powder had been added, the solution was held at room temperature for 24 h and stirred with a magnetic stir bar. After 24 h, the residue produced was further mixed with LiCl (99%, Alfa Aesar) for purpose of intercalation and delamination of the nanosheet layers, for 12 h. The solution was then washed and centrifuged with deionized water until the MXene reached the desired pH of ~5-6. The goal was to obtain dark supernatants that indicated the formation of a dispersion of delaminated MXene flakes. The sediment containing residual MAX phase as well as MXene multilayer particles are rejected. During the final washing process, it was desired to observe "swelling" of the MXene, where the sediment expands in the centrifuge tube due to delamination, as this indicated that a high MXene yield was obtained.

When not in use, the solution was kept refrigerated near 7° C. MXene flakes do not remain stable indefinitely in conditions where water, oxygen, and light are present so it was important to store MXene in a cool, dark environment such as a refrigerator to prevent oxidation and flake degradation.

Example 1.2. Substrates

The deposition mechanism used in these Examples was spray coating. Since the MXene films were not be freestanding, the substrate properties needed to be considered. Paper products allowed too much absorption of the solvent due to their rough and porous surfaces that result in warping and deformation of the substrate. Certain polymer films offered the ability to be thin and flat while also exhibiting minimal absorption. The substrate selected for a spray coated MXene voice coil was a polyethylene terephthalate (PET) film supplied as DuraLar™ (Grafix Plastics, Maple Heights, Ohio), of 150 μm thickness. Similar to Mylar® (DuPont, Wilmington, Del.), DuraLar™ comprises biaxially oriented polyethylene terephthalate (BoPET). This substrate had a matte finish, indicating that it had increased surface roughness than its fully transparent counterparts. DuraLar™ was chosen as a low cost, readily available substrate. Commercial speakers, such as Magnepan and HiFiMan commonly use Mylar in the diaphragm, therefore BoPET was an appropriate material selection. DuraLar of the grade chosen had an elastic modulus of 4.9 GPa, and had a recommended service temperature range from −70° C. to 150° C. While the melting point of this grade of DuraLar occurs at 200° C., recommended service temperature was a better indication of when the material became mechanically unstable. Above 150° C., it was expected that the material would thermally deform.

The substrate was treated with an oxygen, O, plasma before spray coat deposition. The $O_2$ plasma was used to increase the hydrophilicity of the substrate by functionalizing the surface without affecting the bulk properties. Under vacuum conditions, a voltage was applied to oxygen that was pumped into the chamber. The result of the applied power was substrate immersion in bombarding oxygen ions. As these ions hit the surface, oxygen-derived free radicals attached to the surface. Functionalized groups with free radicals are chemically unstable. In search of electrons, these groups readily adhere to an applied coating. X-ray photoelectron spectroscopy (XPS) showed an increased presence of C—O═C and C—O bonds within 10 nm of the surface of PET after plasma cleaning. It has been reported that O plasma creates O-containing functional groups such as carboxyl and hydroxyl groups on the surface of PMMA. It should be noted that surface functionalization by $O_2$ plasma is a short-lived phenomenon, as the highly reactive free radicals interact with contaminants in the atmosphere. This said, the time between substrate cleaning and MXene deposition was minimized. After the substrates were cleaned, they were immediately transferred to the spray coating station.

Example 2. Experimental Methods

Example 2.1. Spiral Voice Coil Design

To explore the effect of voice coil geometry on loudspeaker performance, six voice coil traces were designed using Adobe Illustrator® (Adobe, San Jose, Calif.). The double Archimedean spiral geometry was chosen due to its effectiveness at maximizing the surface area of the diaphragm. The hope was that this design would maximize the interactions between the electromagnetic voice coil trace and the permanent magnets used in the design. This, in turn, as expected to increase the Lorentz force moving the diaphragm. Additionally, this geometry allowed a single layer spray coat to be used without the need for tape to insulate intersections of MXene.

Each trace was cut out of DuraLar™ using a VLS6.60 laser cutter (Universal Laser Systems, Scottsdale, Ariz.) controlled by a native positioning software. The system had an enclosed 40 W $CO_2$ laser with an active ventilation system. The software is capable of reading Adobe Illustrator files, where the vectors are colored red (R:255, G:0, B:0) with a 0.1 inch line thickness. The input parameters were as follows: power: 20%, speed: 100%, PPI: 1000, depth: 0.005 inches/125 μm.

Figure 4:
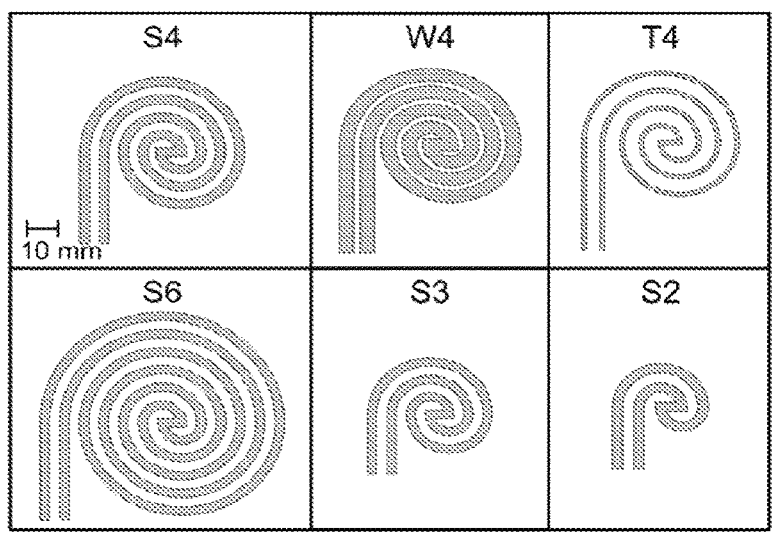
FIG. 4 shows various voice coil traces used in the Examples.

The variations of coil geometries are shown in FIG. 4. They were designed to study the effect of varying coil width, and the total coil length on loudspeaker performance. The naming convention was as follows: Each coil was assigned a letter and number. The letter represented coil thickness, where standard (S) width was 3 mm, wide (W) width was 5 mm, and thin (T) width was 1.5 mm. The number (2-6) was the number of spiral turns from the central horizontal line. The length of each coil was taken from the tangent point of the outermost spiral turn. All coil dimensions are listed in Table 2.

TABLE 2

Coil trace geometry

| Coil Name | Width (mm) | Number of turns | Length (mm) |
|---|---|---|---|
| S4 | 3 | 4 | 324 |
| W4 | 5 | 4 | 334 |
| T4 | 1.5 | 4 | 320 |
| S6 | 3 | 6 | 777 |
| S3 | 3 | 3 | 183 |
| S2 | 3 | 2 | 94 |

Example 2.2. Surface Treatment

As noted above, each coil was treated with $O_2$ plasma to enhance wettability during spray coating. Individual coils were placed in the chamber of a Tergeo-plus (PIE Scientific, Union City, Calif.) plasma cleaner. To create the plasma, the cleaning chamber was pumped down to 100 mTorr. Oxygen gas was then vented into the system and power applied to the gas. For one minute, constant pulse of $O_2$ plasma immersed the sample at 4 standard cubic centimeter (sccm) at 50 W. Since the material used in the spray coating was an aqueous mixture of $Ti_3C_2T_x$, a hydrophilic surface was necessary to maintain an even MXene coating. The O-plasma is known to functionalize the surface of polymers. After removing the coils from the plasma chamber, they were immediately subject to spray coating.

Example 2.3. Deposition of $Ti_3C_2T_x$

Figure 5A:
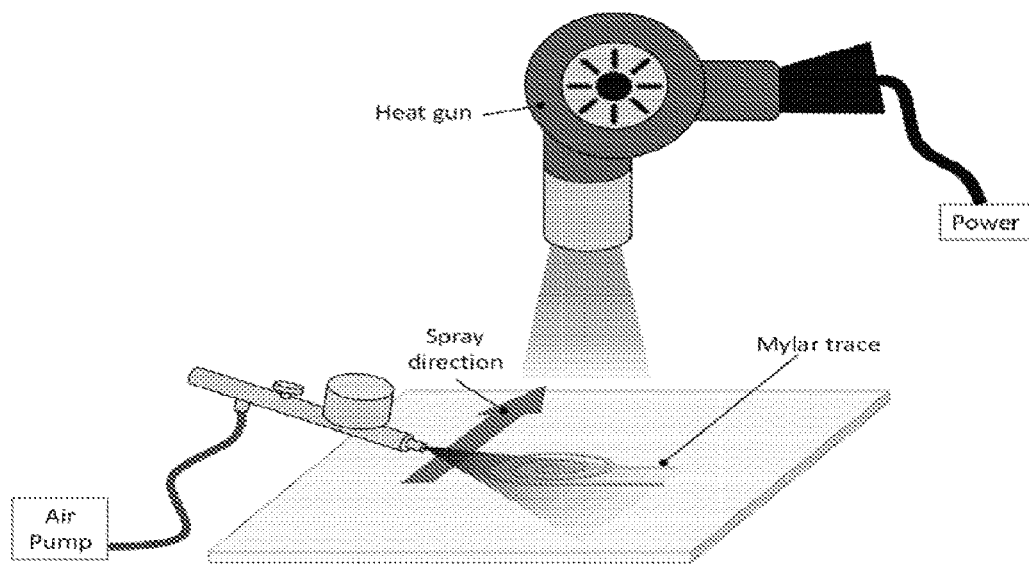
FIG. 5(A) shows a schematic of an exemplary spraying set-up described in the Examples.

The $Ti_3C_2T_x$ was deposited onto the substrate using an airbrush to create as uniform of a surface as possible. Previous spray coating experiments showed that any material deposited thicker than 1 μm was wasteful and unnecessary. Water was used as the solvent in a 1 g/L solution, and the airbrush was adjusted so the expelled material covered the coil trace entirely during each pass of the airbrush. A heat gun was positioned 25 cm above the spraying surface to aid in evaporation of the solvent. The temperature of the coils subject to the heat gun after 5 minutes was ~63° C. Each layer of deposited MXene solution was allowed to dry completely after each pass. Each spray was determined complete when the dried MXene coating appeared even, about 20 mL of solution. FIG. 5(A) shows a schematic of the spray setup used for this experiment. Two of each coil trace designs, S4, W4, T4, S6, S3, and S2, were sprayed. One set of coils were placed into a desiccator after spraying, while another set was annealed. The annealed coils were placed in a vacuum oven held at 100° C. for 24 h to remove excess water.

Figure 5B:
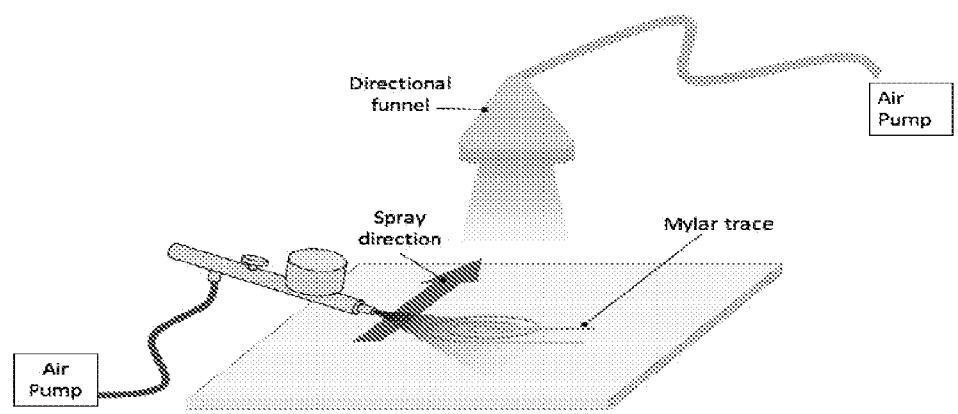
FIG. 5(B) shows a schematic a second exemplary spraying set-up described in the Examples.

In certain circumstances, a modified set-up was used, in which the heat gun was replaced a system using compressed air at room temperature. This was channeled through a tube with a funnel attached to the end. A schematic can be seen below in FIG. 5(B).

Example 2.4. Voice Coil Trace Impedance Measurements

After 24 h of post spray treatment, each coil was tested to characterize their respective electrical impedances. Using a BK Precision 878A LCR meter (Yorba Linda, Calif.), impedance was measured by positioning two probes at each end of the coils, spanning its entire length. The 878A LCR meter was capable of measuring impedances at 120 Hz and 1 kHz.

Example 2.5. Applying Coil to Diaphragm

After 24 h in the desiccator and oven, each sprayed coil trace was adhered to a 3×3" square of matte, 75 µm thick DuraLar™ substrate. The coils were positioned on a Petri dish with the conductive coating facing down and sprayed with adhesive (Elmer's®, Columbus, Ohio). Diaphragms were then carefully placed down on the adhesive side of the coil, ensuring adhesion before lifting off its mounting base.

Figure 6:
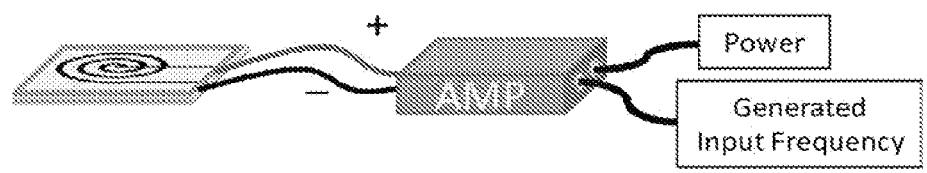
FIG. 6 shows a schematic of planar magnetic speaker electronic assembly discussed in the Examples.
Figure 7:
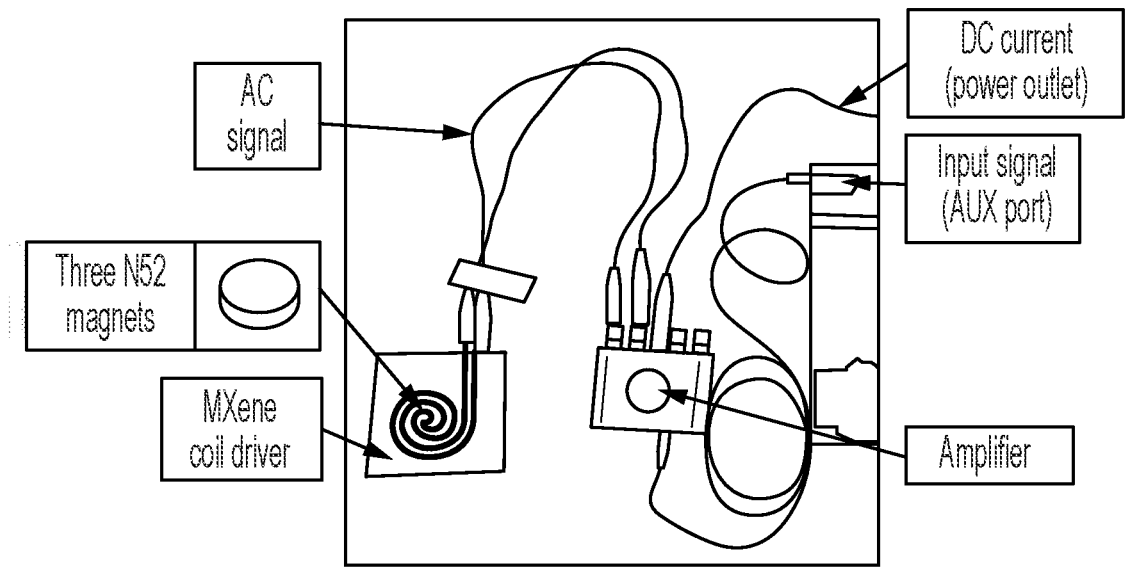
FIG. 7 shows a photograph of loudspeaker setup discussed in Examples.

Example 2.6. Integrating Spiral Voice Coil Trace and Diaphragm with Frame, Amplifier To reduce damping of the generated acoustic waves, the diaphragms were fastened to a frame designed using Adobe Illustrator® and cut out of 3.175 mm thick acrylic sheet with a 40 W laser cutter. Positioned below the center of the coil were three N52 (1.44 T) circular (32 mm radius, 2 mm thick) neodymium magnets. Copper tape with conductive adhesive (6.35 mm wide, 0.047 mm thick) was placed along the ends of the voice coil to protect the MXene coating during connection to the amplifier. Alligator clips were then clamped to the Cu tape, attaching it to one channel of a commercially available Mo-gu F900 2-channel 100 W amplifier with 12V/5A DC power supply adapter. The individual channel has a max power output of 50 W. The input signal was transmitted through the amplifier via a standard 3.5 mm auxiliary (AUX) port. FIG. 6 diagrams a schematic of the device and FIG. 7 shows a photograph of the assembled device.

Example 2.7. Sound Pressure Level Measurement

Figure 8:
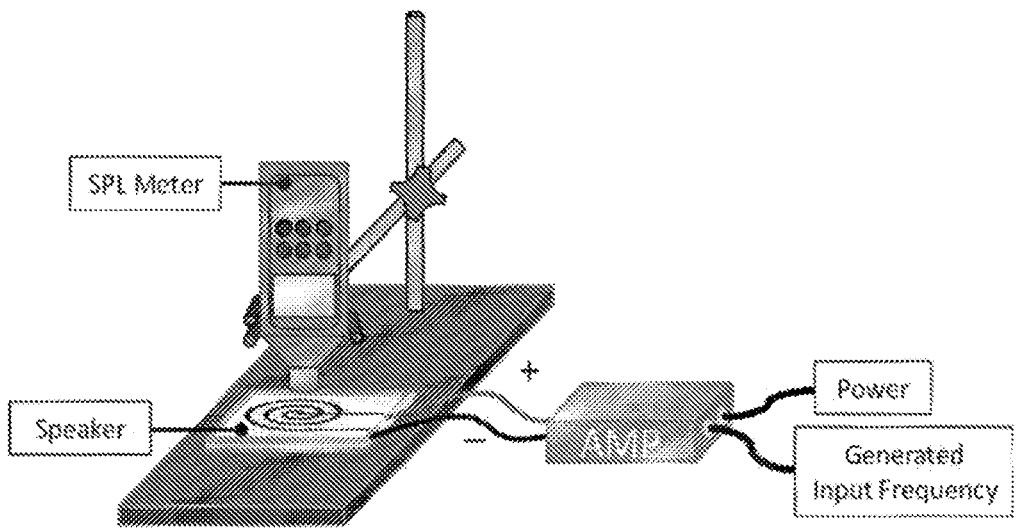
FIG. 8 shows a diagram of an SPL setup discussed in the Examples.

In an acoustically insulated room (Recording Studio E, Drexel University), the A-weighted decibel sound pressure levels (dBA SPL) of each coil were measured. Different to a raw dB SPL measurement, A-weighting accounts for the loudness perceived by the human ear at each frequency. FIG. 8 shows the experimental setup. The coil diaphragm was attached to a mounting stand, with a CM-130 SPL Meter (Galaxy Audio, Wichita, Kans.) positioned 10 mm above the coil centerline. With the amplifier set for maximum power output, a series of audio input frequencies were generated using Pro Tools Signal Generator (Avid, Burlington, Mass.). Humans are capable of hearing frequencies from 20 Hz to 20 kHz. Signals of 20, 125, 250, 500, 1000, 2000, 4000, 8000, 16000, and 20000 Hz were set at −20 dBFS (decibels relative to full scale). The output volume, −20 dBFS was chosen to minimize the risk of thermal degradation of the voice coil.

Example 2.8. Voice Coil Design Refinement

When investigating the designs used by popular planar magnetic headphone companies, such as Audeze, it was observed that a serpentine pattern for the conductive voice coil trace, was used more often than the double Archimedean spiral. The serpentine pattern allows for a more convenient location to place the magnetic bars, in the gaps created by the serpentine, allowing for the maximization of magnetic flux density. The overall encompassing shape of the conductive material was rectangular, which maximized conductive coverage on a square diaphragm. With the double Archimedean spiral, the shape of it causes a significant amount of wave interference and sound damping. It is desirable to have a clearer sound created as well as to maximize the magnetic flux density.

In a similar method, three coils were designed with varying geometric properties. FIG. 9 displays each serpentine trace design and Table 3 details the properties of each design. These designs were laser cut out of 125 µm DuraLar.

TABLE 3

Geometric attributes of serpentine trace designs

| Coil | Width (mm) | Number of turns | Length (mm) |
|------|------------|-----------------|-------------|
| S7   | 6.4        | 7               | 678         |
| W7   | 9.5        | 7               | 714         |
| W23  | 9.5        | 23              | 1058        |

Example 2.9. Magnet Arrangement

Once the best coil was determined, the magnet array was designed. Whereas the spiral coils used circular magnets, rectangular magnets were better suited for the serpentine design. An array of 14 N52 (1.44 Tesla) neodymium magnets affixed in the gaps of the coil trace. Along each gap sat two magnets with total thickness of 6 mm, width 10 mm, and length 60 mm. A schematic of the array is displayed in FIG. 10.

Example 2.10. Loudspeaker Assembly

Figure 11:
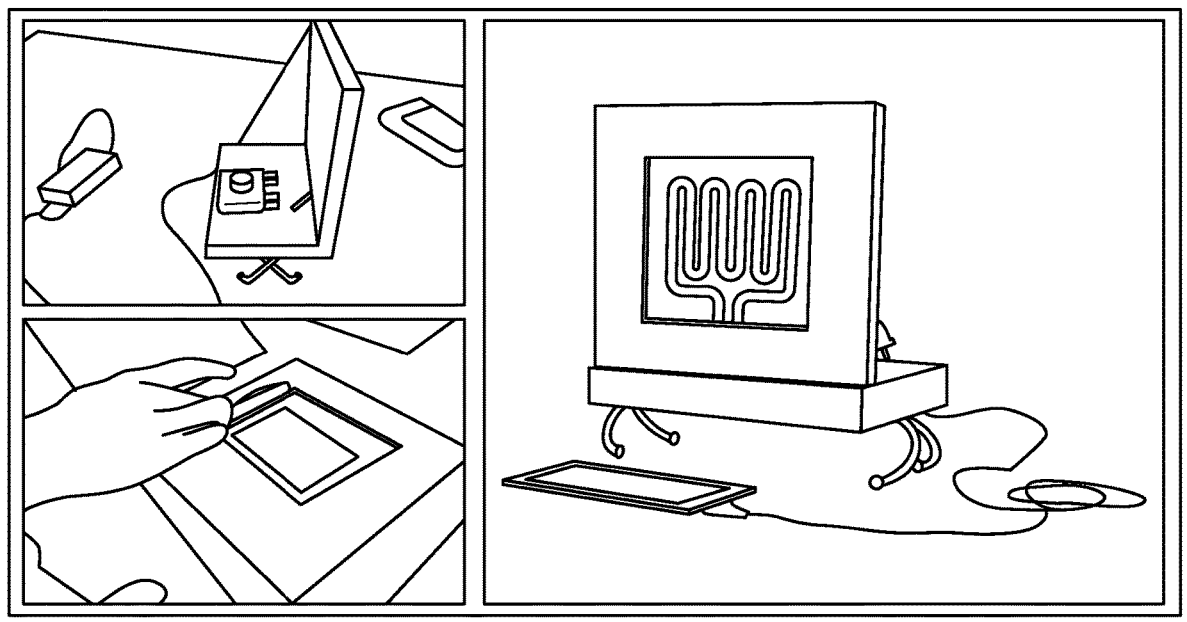
FIG. 11 shows a picture of a final assembly build process discussed in the Examples.

As the goal of the project was to create a working prototype of a speaker utilizing MXene, an enclosure was designed and created to easily store the amplifier and diaphragm using ¼" birch plywood. The magnet arrangement was glued onto a wooden board to ensure that the magnets did not move during testing, and the back of the enclosure stored the amplifier. The entire process and final assembly of the loudspeaker can be seen in FIG. 11 below.

Example 3. Results and Discussion

Example 3.1. Substrate Acceptance of Spray Coat

An aqueous $Ti_3C_2T_x$ solution (1 g/L) was sprayed onto all 12 coil traces. After spraying, six samples were placed in a vacuum desiccator, while the other six were placed in a vacuum furnace, set at 100° C. After 24 h of exposure, the mass of each coil was measured and recorded in Table 4.

TABLE 4

Mass of MXene spray coat on DuraLar coil traces

| Coil | Uncoated coil mass (mg) | MXene coating mass (mg) | | Relative difference |
|------|-------------------------|-------------------------|---|---------------------|
|      |                         | 24 hour anneal @ 100° C. | No heat treatment | |
| S4   | 198                     | 21                      | 21  | 0%  |
| W4   | 316                     | 52                      | 58  | 11% |
| T4   | 86.7                    | 14                      | 21  | 51% |
| S6   | 385                     | 42                      | 36  | 15% |
| S3   | 108                     | 16                      | 18  | 15% |
| S2   | 75.0                    | 12                      | 11  | 6%  |

The differences in mass between both sample sets were relatively small. For speakers to oscillate efficiently, the overall mass must be tuned to the device's design. For example, consider the hypothetical example of two loudspeakers, identical in design. Both devices have a coil of identical geometry and conductivity, but different masses. The loudspeaker with the lighter weight coil should produce a higher sound pressure level. The weight of the MXene layer directly affects the weight of the oscillating mass, thus is an important characteristic of the final design.

Figure 12A:
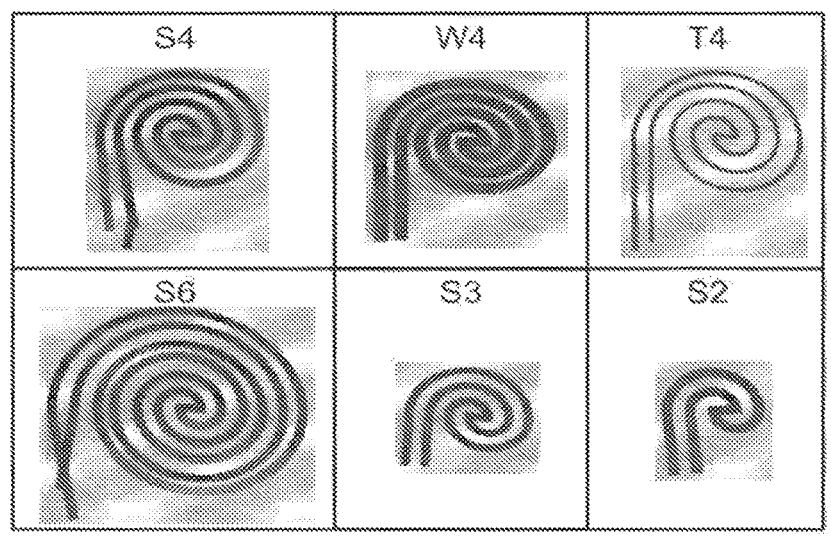
FIGS. 12(A) and 12(B) show $Ti_3C_2T_x$ sprayed annealed and vacuum dessicated coils, respectively, fixed on a diaphragm.
Figure 12B:
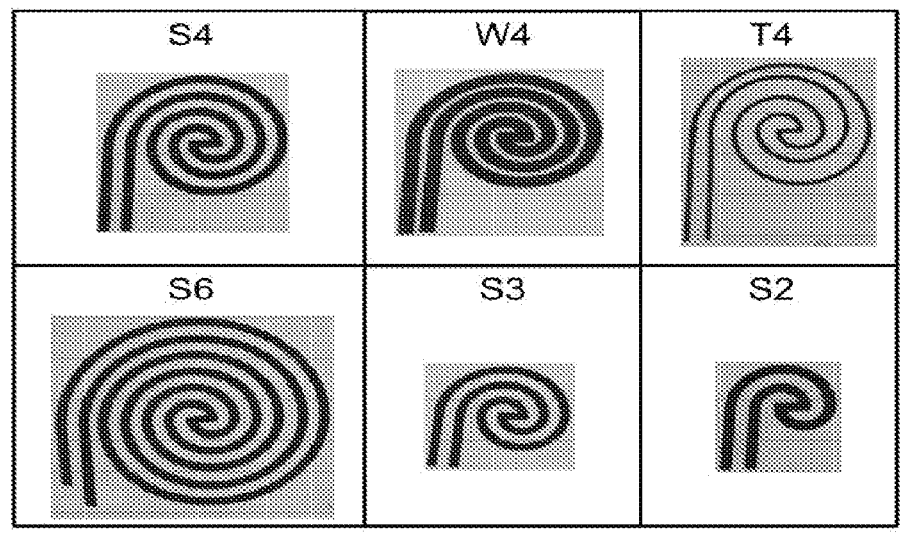

After removing the annealed samples from the oven, bubbles were observed along the traces of S4, S6, and S3. It was not clear whether this was due to any result of residual water in the sprayed solution or the result of poor adhesion resulting from a coefficient of thermal expansion mismatch between the MXene and DuraLar™. A picture of the final coils, adhered to the diaphragm, are shown in FIGS. 12(A-B). Coil trace S4 and S6 display noticeable defects, which will be discussed elsewhere herein.

Example 3.2. Spiral Voice Coil Trace Impedance

When taking impedance measurements using the LCR Meter, the available frequency options were either 120 Hz or 1000 Hz. Three measurements were taken at each frequency for each coil. Each measurement iteration resulted in identical values. Table 5 shows results from those measurements.

TABLE 5

Voice coil trace impedance values at 120 and 1000 Hz ($\Omega$)

| | Coil | Impedance ($\Omega$) 120 Hz | 1000 Hz |
|---|---|---|---|
| Annealed | S4 | 30 | 30 |
| | W4 | 19 | 19 |
| | T4 | 59 | 60 |
| | S6 | 69 | 69 |
| | S3 | 18 | 18 |
| | S2 | 10 | 10 |
| No heat treatment | S4 | 36 | 36 |
| | W4 | 21 | 21 |
| | T4 | 55 | 55 |
| | S6 | 88 | 88 |
| | S3 | 19 | 20 |
| | S2 | 12 | 12 |

It is important to note that across any typical speaker, the impedance values varied with frequency. Most commercial loudspeakers have impedance values between 4-8$\Omega$, while headphones have impedance values that vary between 30-100.0. Based on the values measured, an application in headphones seems to be more plausible. The values that were obtained during the measurements using the LCR meter were nearly the same when comparing 120 Hz to 1000 Hz. According to the values obtained, two conclusions were drawn:

1) Longer coils result in higher impedance values, as shown with the S6 coils having the highest impedance value of standard width (S-) coils, subsequently followed by S4, S3, and S2.
2) Thinner coils result in higher impedance value, as T4 had the highest impedance values of the 4 turn designs, followed by S4 and W4.

Example 3.3. Spiral Voice Coil Trace Sound Pressure Level Measurement

Figure 13:
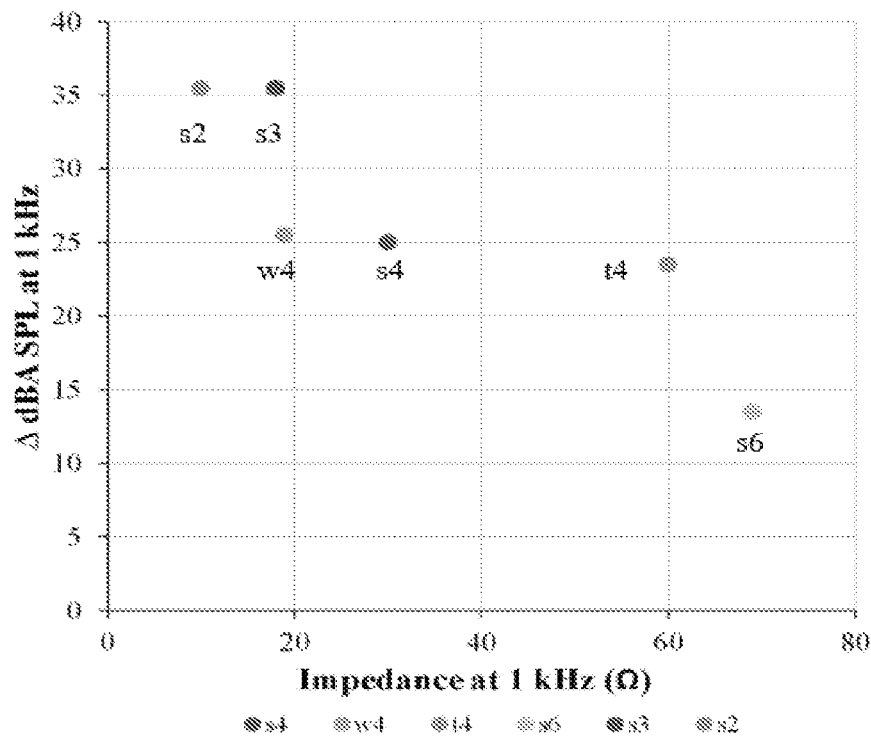
FIG. 13 shows sound pressure levels at 1000 Hz versus impedance at 1000 Hz.

The sound pressure level measurements at 1000 Hz were compared to the impedance values at 1000 Hz because 1000 Hz was the only frequency in which both an impedance and sound pressure level measurement were taken. $\Delta$dBA SPL was calculated by measuring the ambient sound levels and then subtracting that from the sound pressure level outputs produced by the voice coil traces. As shown in FIG. 13, the S2 and S3 coil designs exhibited the highest sound pressure level outputs (35.5 $\Delta$dBA SPL for both), and they also had the lowest impedance values, 10$\Omega$, and 18$\Omega$ respectively. It was possible that the additional turn in the S3 coil resulted in a larger electromagnetic field, making up for the greater impedance. S6, the longest coil design, exhibited the lowest sound pressure level output of 13.5 $\Delta$dBA SPL, while having the highest impedance value, 88$\Omega$.

Figure 14A:
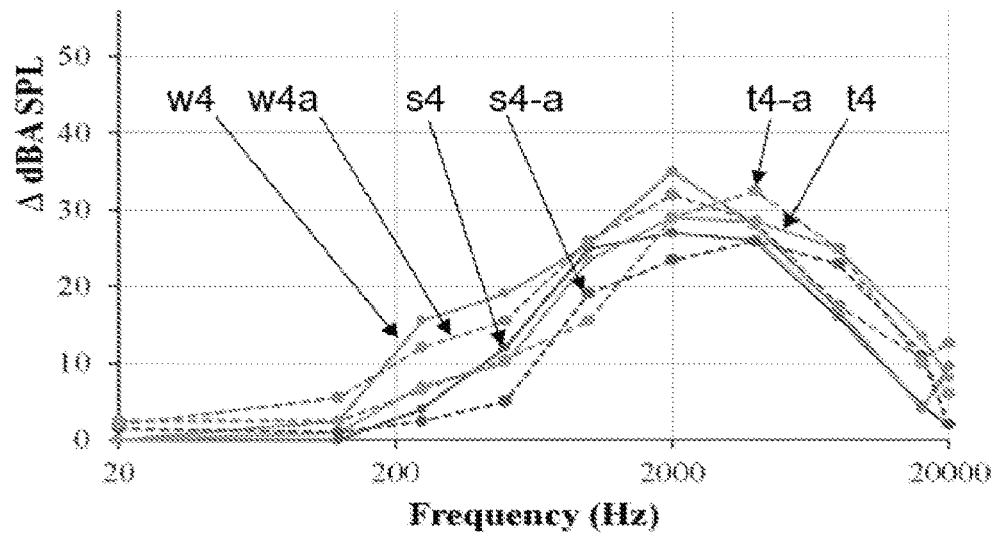
FIGS. 14(A) and 14(B) shows effect of trace width and length, respectively, on sound pressure levels on several exemplary embodiments.
Figure 14B:
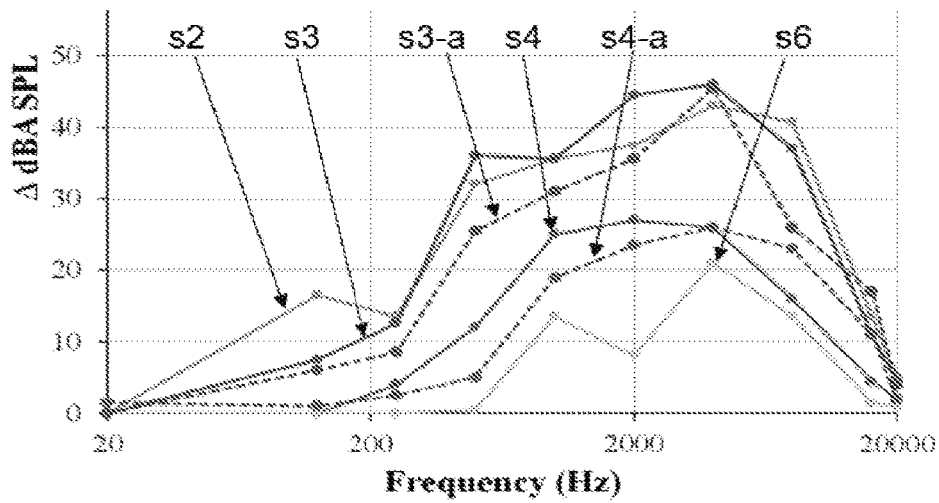

During evaluation of the sound pressure levels, the effect of voice coil width and voice coil length were investigated based on the observations made during the electrical impedance measurements. As shown in FIG. 13, the loudest sound pressure levels were generated by the voice coil designs that had the lowest impedances. While comparing voice coil widths, the widest coil, W4, exhibited the highest SPL output, seen in FIG. 14(A). While comparing the voice coil lengths, shown in FIG. 14(B), the shortest coils, S2 and S3, exhibited the highest SPL output. Although a higher sound pressure level output was exhibited by voice coil designs S2 and S3, the S6 voice coil frequency response curve most closely resembled the inverse of the perceived human curve. This may have been due to the maximizing of the voice coil trace coverage on the diaphragm allowing for a more even oscillation of the diaphragm, reducing damping effects or the non-uniformity of magnetic force.

Example 3.4. Serpentine Voice Coil Trace Impedance

To conserve material, a relatively small layer of MXene was deposited onto each trace. From there, impedance was measured at 1000 Hz to determine the most promising geometry, shown in Table 6. It was clear that W7 had the lowest impedance at 250$\Omega$. From there, additional MXene was deposited onto the coil until a thickness of approximately 1.5 µm was achieved. This brought the impedance down from 250$\Omega$ to 40$\Omega$.

TABLE 6

Impedance of serpentine coils

| Coil | Impedance ($\Omega$) 1000 Hz |
|---|---|
| S7 | 345 |
| W7 | 250 |
| W23 | 378 |

Example 3.5. Serpentine Voice Coil Trace Sound Pressure Level Measurement

Figure 15:
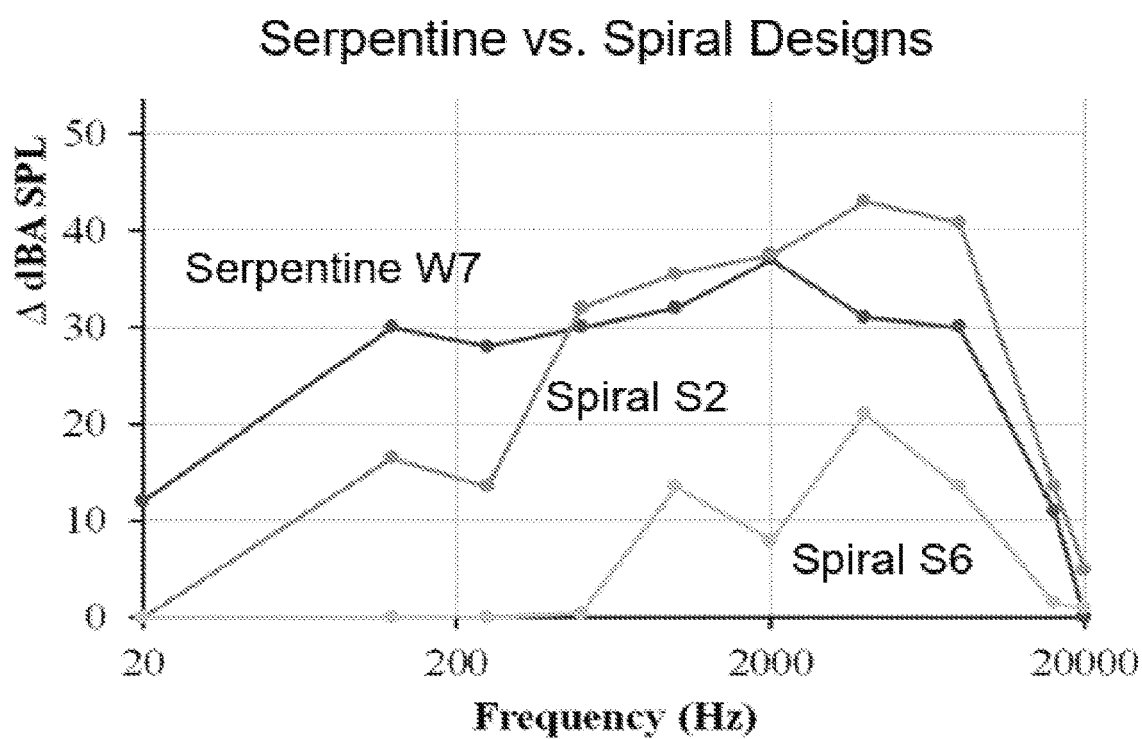
FIG. 15 shows ΔdBA SPL output of serpentine coil compared to spiral coils.

An identical setup (FIG. 8) was used to measure sound pressure output of the coil at varying geometries. FIG. 15 shows the results compared to the spiral designs. It can be seen that the serpentine design similar dBA SPL outputs at frequencies at and above 500 Hz. The serpentine, however, exhibited the largest dBA SPL output at frequencies below 500 Hz. It was speculated that this was due to the increased magnetic flux density from the design of the magnetic array. Additionally, this design had the most coverage on the diaphragm. This resulted in more even oscillation of the entire diaphragm, rather than concentrated oscillation around the diaphragm's central point. Typically, planar magnetic headphones exhibited better bass responsiveness than dynamic cone drivers The following references are believed to be useful in understanding the concepts and descriptions herein, and each is incorporated by reference for its each respective purpose.

REFERENCES

[1] He Tian, Dan Xie, Yi Yang, Tian-Ling Ren, Yu-Feng Wang, Chang-Jian Zhou, Ping-Gang Peng, Li-Gang Wangab and Li-Tian Liu, "Single-layer graphene sound-emitting devices: experiments and modeling," Nanoscale, 2012, 4, 2272-2277.

[2] Kathleen Maleski, Vadym N. Mochalin, and Yury Gogotsi, "Dispersions of Two-Dimensional Titanium Carbide MXene in Organic Solvents," Chem. Mater. 2017, 29, 1632-1640 (2017)

[3] Anasori, Babak, Maria R. Lukatskaya, and Yury Gogotsi. "2D metal carbides and nitrides (MXenes) for energy storage." *Nature Reviews Materials* 2 (2017): 16098.

[4] Michael Naguib, Murat Kurtoglu, Volker Presser, Jun Lu, Junjie Niu, Min Heon, Lars Hultman, Yury Gogotsi,* and Michel W. Barsoum*, "Two-Dimensional Nanocrystals Produced by Exfoliation of $Ti_3AlC_2$," *Advanced Materials*, Vol. 23, Pages 4248-4253, 2011.

[5] "Alternating Current (AC) vs. Direct Current (DC)—learn.sparkfun.com", Learn.sparkfun.com, 2018. [Online]. Available: https://learn.sparkfun.com/tutorials/alternating-current-ac-vs-direct-current-dc. [Accessed: 19 Mar. 2018]

[6] V. Sala, M. Delgado, J. Cusido, and L. Romeral, "Diagnosis method for suspension-errors detection in electrodynamic loud-speakers," 2011 IEEE International Instrumentation and Measurement Technology Conference, 2011

[7] R. Nave, "Faraday's Law", Hyperphysics.phy-astr.gsu.edi, 2018. [Online]. Available: http://hyperphysics.phy-astr.gsu.edu/hbase/electric/farlaw.html. [Accessed: 19 Mar. 2018]

[8] "How do speakers work?", Periodmagnets.wikispaces.com, 2018. [Online]. Available: https://period7magnets.wikispaces.com/How+do+speakers+work%3F. [Accessed: 19 Mar. 2018]

[9] Audeze, LLC, "Thin film circuit for acoustic transducer and methods of manufacture", U.S. Pat. No. 9,432,788 B2, 2016.

[10] Wang, Jessie "Ultrasonic Transducers and Ultrasonic Sensors—Beijing Ultrasonic", Beijing Ultrasonic, 2018. [Online]. Available: https://www.bjultrasonic.com/ultrasonic-technical-info/ultrasonic-transducers-and-ultrasonic-sensors/. [Accessed: 19 Mar. 2018].

[11] M. Klasco and S. Tatarunis, *The Voice Coil: Parts and Production*. AudioXpress, 2012, pp. 7-12.

[12] Copper alloy data [Online]; A J Oster; Warwick, R I; 2013; http://www.ajoster.com/sites/default/files/downloads/C-11000_B152_copper_aj-oster.pdf (accessed Mar. 10, 2018).

[13] Aluminum 6061-T6 [Online]; Aerospace Specification Metals Inc.; Pampano Beach, Fla.; 2017; http://asm.matweb.com/search/SpecificMaterial.asp?bassnum=ma6061t6 (accessed Mar. 10, 2018).

[14] Gary Davis, Ralph Jones, The sound reinforcement handbook, Hal Leonard Corporation, 1989 ISBN 0881889008

[15] M. Asgarisabet, R. Czapla, J. Krueger, "COMSOL Multiphysics® Simulation of Electro Dynamic Planar Loudspeaker (EDPL)" HARMAN International, Lifestyle Division, Novi, Mich., USA.

[16] Mohamed Alhabeb, Kathleen Maleski, Babak Anasori, Pavel Lelyukh, Leah Clark, Saleesha Sin, Yury Gogotsi*, "Guidelines for Synthesis and Processing of 2D Titanium Carbide ($Ti_3C_2T_x$ MXene)"

[17] R. Nave, "Features of Equal Loudness Curves", Hyperphysics.phy-astr.gsu.edu, 2018. [Online]. Available: http://hyperphysics.phy-astr.gsu.edu/hbase/Sound/earcrv.html. [Accessed: 19 Mar. 2018].

[18] Qin Zhou and A. Zettla, "Electrostatic Graphene Loudspeaker," Center of Integrated Nanomechanical Systems, University of California at Berkeley, Berkeley (2013)

[19] Kanit Hantanasirisakul, Meng-Qiang Zhao, Patrick Urbankowski, Joseph Halim, Babak Anasori, Sankalp Kota, Chang E. Ren, Michel W. Barsoum, and Yury Gogotsi, "Fabrication of $Ti_3C_2T_x$ MXene Transparent Thin Films with Tunable Optoelectronic Properties" Adv. Electron. Mater. 2016, 1600050

[20] Andrew D. Dillon, Michael J. Ghidiu, Alex L. Krick, Justin Griggs, Steven J. May, Yury Gogotsi, Michel W. Barsoum,* and Aaron T. Fafarman*, "Highly Conductive Optical Quality Solution-Processed Films of 2D Titanium Carbide," Advanced Function Materials (2016)

[21] Michael Naguib, Jérémy Come, Boris Dyatkin, Volker Presser, Pierre-Louis Taberna, Patrice Simon, Michel W. Barsoum, Yury Gogotsi "MXene: a promising transition metal carbide anode for lithium-ion batteries" *Electrochemistry Communications* Volume 16, Issue 1, March 2012, Pages 61-64

[22] General DuraLar Spec Sheet [Online]; Grafix Plastics; Maple Heights, Ohio; 2018; https://www.grafixplastics.com/materials-plastic-film-plastic-sheets/commodity-plastic-film/polyester-mylar-duralar-film/duralar-polyester-film-sheet-products/archival-film-duralar/(accessed Mar. 10, 2018)

[23] A. Vesel, M. Mozetic, and A. Zalar, "XPS study of oxygen plasma activated PET," Vacuum, vol. 82, no. 2, pp. 248-251, 2007.

[24] R. Landgraf, M.-K. Kaiser, J. Posseckardt, B. Adolphi, and W.-J. Fischer, "Functionalization of Polymer Sensor Surfaces by Oxygen Plasma Treatment," Procedia Chemistry, vol. 1, no. 1, pp. 1015-1018, 2009.

[25] Doctorproaudio.com. (2018). Speaker power handling<Pro-Audio References. [Online] Available at: http://www.doctorproaudio.com/doctor/temas/powerhandling.htm (Accessed 12 Mar. 2018).

[26] Zhou Q and Zettl A 2013 "Electrostatic graphene loudspeaker" Appl. Phys. Lett. 102 223109

All references cited within this specification are incorporated by reference in their entireties for all purposes, or at least for their teachings in the context of their recitation.

What is claimed:

1. A voice coil comprising a patterned MXene composition attached to a biaxially oriented polyaromatic polymer film that has undergone oxygen plasma treatment to effect increased hydrophilicity.

2. The voice coil of claim 1, wherein the MXene composition comprises at least one layer having first and second surfaces, each layer described by a formula $M_{n+1}X_nT_x$ and comprising:
   a substantially two-dimensional army of crystal cells,
   each crystal cell having an empirical formula of $M_{n+1}X_n$, such that each X is positioned within an octahedral array of M,
   wherein M is at least one Group IIIB, IVB, VB, or VIB metal,
   wherein each X is C, N, or a combination thereof;
   n=1, 2, or 3; and wherein
   $T_x$ represents surface termination groups.

3. The voice coil of claim 1, wherein the MXene composition at least one layer having first and second surfaces, each layer comprising:
   a substantially two-dimensional army of crystal cells,
   each crystal cell having an empirical formula of $M'_2M''_nX_{n+1}$, such that each X is positioned within an octahedral array of M' and M", and where $M''_n$ are present as individual two-dimensional array of atoms intercalated (sandwiched) between a pair of two-dimensional arrays of M' atoms,
   wherein M' and M" are different Group IIIB, IVB, VB, or VIB metals (especially where M' and M" are Ti, V, Nb, Ta, Cr, Mo, or a combination thereof),
   wherein each X is C, N, or a combination thereof; and
   n=1 or 2.

4. The voice coil of claim 1, wherein the biaxially oriented polyaromatic polymer film comprises a polyester, a polyphenylene oxide, a polyamide, or a polyphenylene sulfide.

5. The voice coil of claim 1, wherein the biaxially oriented polyaromatic polymer film comprises polyethylene terephthalate, polyethylenenaphthalate, or a polyphthalamide.

6. The voice coil of claim 1, wherein the voice coil is patterned in a spiral or serpentine pattern.

7. The voice coil of claim 1, wherein the voice coil is patterned in double Archimedean coil.

8. A planar electrical device comprising the voice coil of claim 1, positioned within a frame.

9. An active acoustic device for receiving or transmitting acoustic waves, the active acoustic device comprising the voice coil of claim 1, optionally comprising two or more magnets positioned proximate to the voice coil.

10. The active acoustic device of claim 9 further comprising two or more magnets positioned proximate to the voice coil.

11. The active acoustic device of claim 9 that is a microphone or a speaker.

12. The active acoustic device of claim 9 that is an electrostatic speaker, an electroacoustic transducer, a thermoacoustic transducer, or a planar speaker.

13. A method of making the voice coil of claim 1, the method comprising spray-coating, spin coating, or roller coating a layer of MXene onto the biaxially oriented polyaromatic polymer film.

14. The method of claim 13, wherein the voice coil is patterned by masking techniques.

15. A method of making the voice coil of claim 1, the method comprising applying at least one layer of MXene composition onto the biaxially oriented polyaromatic polymer film and removing at least a portion of the applied MXene composition by wet or plasma or laser etching techniques to form a MXene pattern on the biaxially oriented polyaromatic polymer film.

16. A method of operating a voice coil of claim 1, the method comprising passing an alternating current through the patterned MXene composition.

17. An active acoustic device for receiving or transmitting acoustic waves, the active acoustic device comprising the planar electrical device of claim 8, optionally comprising two or more magnets positioned proximate to the voice coil.

18. A method of operating the planar electric device of claim 8, the method comprising passing an alternating current through the patterned MXene composition.

19. A method of operating the active acoustic device of claim 9, the method comprising passing an alternating current through the patterned MXene composition.

* * * * *